US007812711B2

(12) United States Patent
Brown et al.

(10) Patent No.: US 7,812,711 B2
(45) Date of Patent: Oct. 12, 2010

(54) PASSENGER VEHICLE SAFETY AND MONITORING SYSTEM AND METHOD

(75) Inventors: Mark Richard Brown, Vancouver (CA); Charles Robert Dotson, Litchfield Park, AZ (US)

(73) Assignee: Alertstar Safety Corporation USA, Tempe, AZ (US)

( * ) Notice: Subject to any disclaimer, the term of this patent is extended or adjusted under 35 U.S.C. 154(b) by 94 days.

(21) Appl. No.: 11/770,674

(22) Filed: Jun. 28, 2007

(65) Prior Publication Data

US 2008/0048886 A1 Feb. 28, 2008

Related U.S. Application Data

(60) Provisional application No. 60/817,195, filed on Jun. 28, 2006.

(51) Int. Cl.
*B60R 25/10* (2006.01)

(52) U.S. Cl. .................. 340/426.18; 340/937; 340/438; 340/439; 701/301

(58) Field of Classification Search ................. 340/937, 340/438, 439, 426.18; 701/301
See application file for complete search history.

(56) References Cited

U.S. PATENT DOCUMENTS

| | | | | |
|---|---|---|---|---|
| 5,382,953 | A | 1/1995 | Hauptli | |
| 5,510,764 | A | 4/1996 | Hauptli | |
| 5,570,127 | A | 10/1996 | Schmidt | |
| 5,677,979 | A * | 10/1997 | Squicciarini et al. | 386/46 |
| 5,952,941 | A * | 9/1999 | Mardirossian | 340/936 |
| 6,515,596 | B2 * | 2/2003 | Awada | 340/905 |
| 6,546,119 | B2 * | 4/2003 | Ciolli et al. | 382/104 |
| 6,580,362 | B1 | 6/2003 | Zimmerman et al. | |
| 6,690,294 | B1 * | 2/2004 | Zierden | 340/937 |
| 6,738,089 | B1 | 5/2004 | Silc | |
| 6,894,717 | B2 * | 5/2005 | Bakewell | 348/149 |
| 6,985,827 | B2 * | 1/2006 | Williams et al. | 702/142 |
| 2002/0019703 | A1 * | 2/2002 | Levine | 701/301 |
| 2004/0193347 | A1 * | 9/2004 | Harumoto et al. | 701/45 |
| 2006/0055561 | A1 * | 3/2006 | Kamali et al. | 340/936 |
| 2006/0220905 | A1 * | 10/2006 | Hovestadt | 340/901 |
| 2008/0157945 | A1 | 7/2008 | Bowler | |

OTHER PUBLICATIONS

Azcentral.com, "Mesa School Buses Try Lenses on For Size", 2 pages, Jun. 6, 2008.

* cited by examiner

*Primary Examiner*—Daryl Pope
(74) *Attorney, Agent, or Firm*—Franklin D. Ubell; Greenberg Traurig, LLP

(57) ABSTRACT

A passenger vehicle safety system is provided which comprises a violation system, a warning system or an inside system. The violation system collects evidence of traffic violation occurring in a vicinity of a passenger vehicle. The warning system provides a warning to individuals outside and in the vicinity of the passenger vehicle. The intra-vehicle system collects images of persons inside, or in the vicinity of, the passenger vehicle, so as to allow the passenger vehicle's driver or one or more individuals located at a remote location, some distance from the passenger, to monitor activity in and around the passenger vehicle. Information captured by the inside system can be viewed in real time, as the information is being collected, or some time later, or both.

40 Claims, 13 Drawing Sheets

Figure 10:
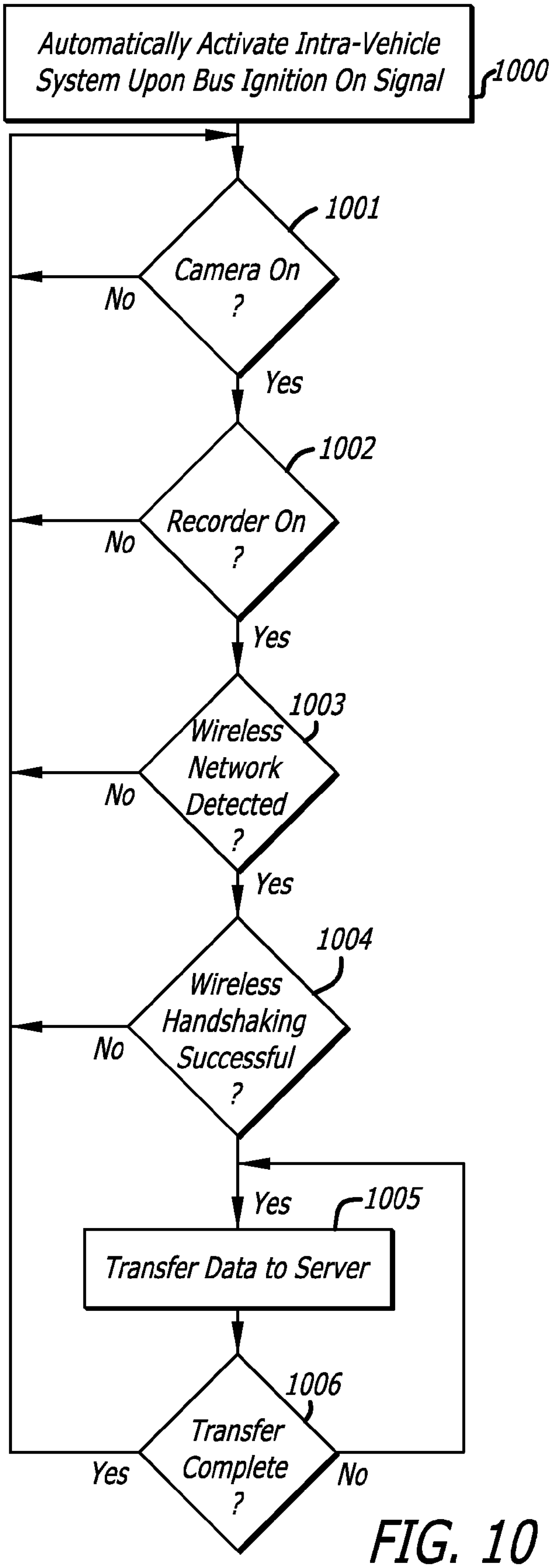

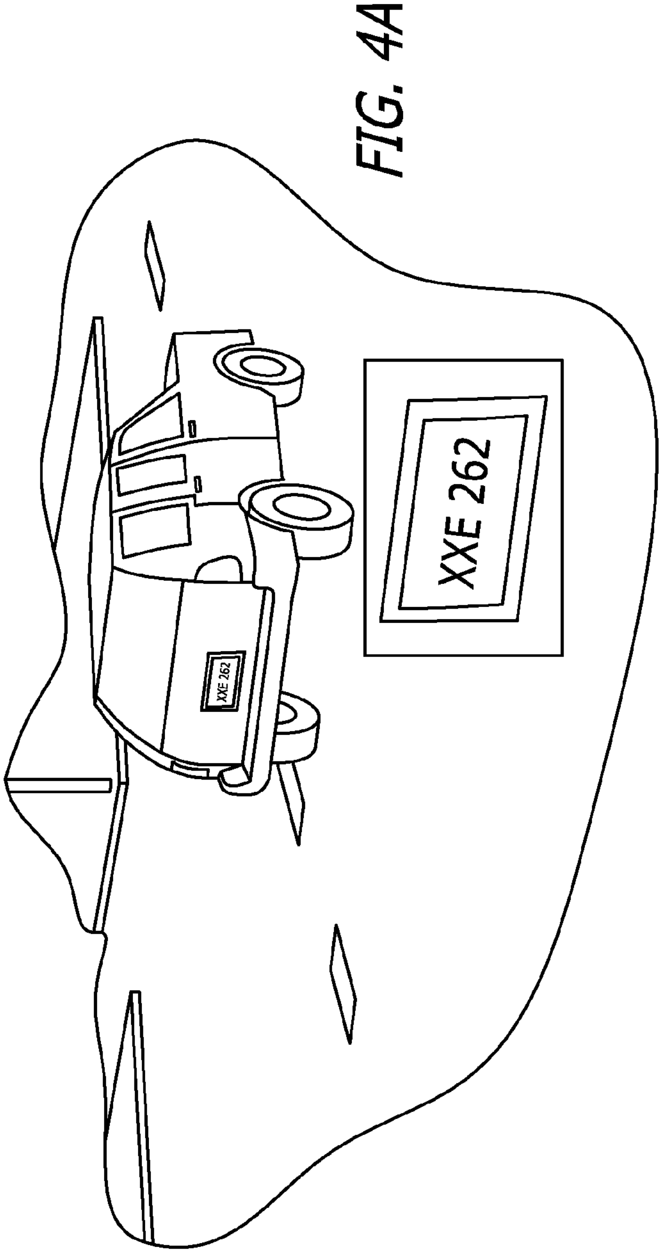
FIG. 4A
10/18/05
11:57 A.M
LAT. 33° 26'21.33"
LON.112° 07' 01.96"
FIG. 4B
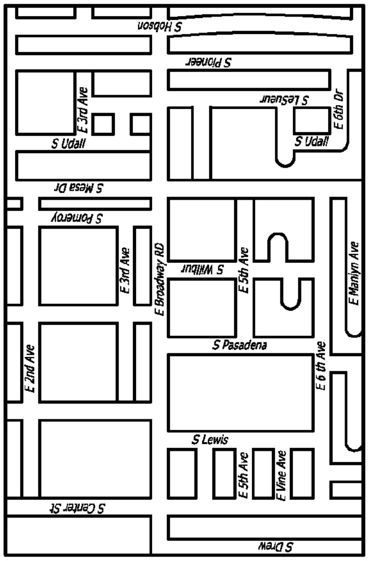
FIG. 4C

| | INPUTS | | | | | | | | OUTPUTS | | | |
|---|---|---|---|---|---|---|---|---|---|---|---|---|
| | DOOR | | BUS SPEED | | YELLOW LIGHTS | | RED LIGHTS | | A/YA | | MAC RECORD | |
| | open | closed | <V set | >V set | On | Off | On | Off | On | Off | On | Off |
| Approaching a Bus Stop Distance > 100 ft | | X | | X | | X | | X | | X | | X |
| Approaching a Bus Stop Distance < 100 ft | | X | X | | X | | | X | X | | | X |
| At Bus Stop - Loading | X | | X | | | X | X | | | X | X | |
| Leaving Bus Stop | | X | X | | | X | | X | X | | | X |
| Leaving Bus Stop | | X | | X | | X | | X | | X | | X |
| Stopped At RR Crossing | X | | X | | | X | | X | | X | | X |
| Stopped At Traffic Control | | X | X | | | X | | X | | X | | X |
| Off - Loading Students At School | X | | X | | | X | | X | | X | | X |

FIG. 7

PASSENGER VEHICLE SAFETY AND MONITORING SYSTEM AND METHOD

RELATED APPLICATIONS

This application claims the Paris Convention Priority of and hereby incorporates by reference as if fully disclosed herein U.S. Provisional Patent Application No. 60/817,195 entitled "Passenger Vehicle Safety and Monitoring System and Method" filed on Jun. 28, 2006.

BACKGROUND

The present disclosure relates to a passenger vehicle safety and monitoring system and method.

SUMMARY

A passenger vehicle safety system is provided which comprises a violation system, a warning system or an inside system. The violation system collects evidence of traffic violation occurring in a vicinity of a passenger vehicle. The warning system provides a warning to individuals outside and in the vicinity of the passenger vehicle. The intra-vehicle system collects images of persons inside, or in the vicinity of, the passenger vehicle, so as to allow the passenger vehicle's driver or one or more individuals located at a remote location, some distance from the passenger, to monitor activity in and around the passenger vehicle. Information captured by the inside system can be viewed in real time, as the information is being collected, or some time later, or both.

According to a feature of the present disclosure, a system is disclosed comprising a violation system to record information associated with a traffic violation that occurs in a vicinity of the passenger vehicle, an intra-vehicle system to monitor behavior, at least a portion of the behavior occurring inside the passenger vehicle, a warning system to provide at least one warning to a person in a vicinity of the passenger vehicle, the warning comprising a visual warning or an aural warning or both, and a controller configured to receive input and to control one or more of the violation, intra-vehicle and warning systems in response to the received input.

According to a feature of the present disclosure, a system is disclosed comprising: processing unit, an alarm unit controlled by the processing unit to generate an output to alert persons on or in a vicinity of a passenger vehicle; a first set of one or more image capturing devices controlled by the processing unit to record evidence of a traffic violation occurring in a vicinity of the passenger vehicle; and a second set of one or more image capturing devices controlled by the processing unit to monitor activity within the passenger vehicle. The processing unit is configured to receive input signals and to generate one or more control signals to control the alarm unit and the image capturing devices.

According to a feature of the present disclosure, a system is disclosed comprising: a first set of one or more cameras, each of the cameras in the first camera set positioned on an external sur face of a passenger vehicle, the first set of cameras configured to record images of a traffic violation occurring in a vicinity of a passenger vehicle; a global positioning system (GPS), the GPS configured to output at least velocity information; a timer configured to output information including a traffic violation time; a warning system to generate one or more alerts for persons in a vicinity of the passenger vehicle of a potentially dangerous condition; an intra-vehicle monitoring system consisting of a second set of one or more cameras mounted within the passenger vehicles and at least two cameras mounted outside the PV where passengers board or exit the PV; a digital video recorder (DVR) device, the DVR storing at least the video captured by the second set of cameras; a memory storing information corresponding to a traffic violation; and a network interface, the network interface of transmitting data to a server.

According to a feature of the present disclosure, a method is disclosed comprising using a passenger vehicle safety system installed in a passenger vehicle, the passenger vehicle safety system capturing one or more images and corresponding information associated with a traffic violation occurring in a vicinity of the passenger vehicle, collecting a fine from a violator using the one or more images and corresponding information; and using at least a portion of the collected fine to install a passenger vehicle safety system in another passenger vehicle.

According to a feature of the present disclosure, a method is disclosed comprising receiving, by a server computer from a passenger vehicle safety computing system, encrypted information comprising one or more digital images and associated information corresponding to a traffic incident occurring in a vicinity of the passenger vehicle; accessing a decrypted copy of the received data to determine whether the traffic incident involved a traffic violation. In a case that the traffic incident is determined to involve a traffic violation, performing the following:

- using information identified from the one or more digital images and associated information to retrieve information corresponding to an individual involved in the traffic incident from a database;
- generating a violation notification; and
- transmitting the violation notification to the individual.

DRAWINGS

Figure 1A:
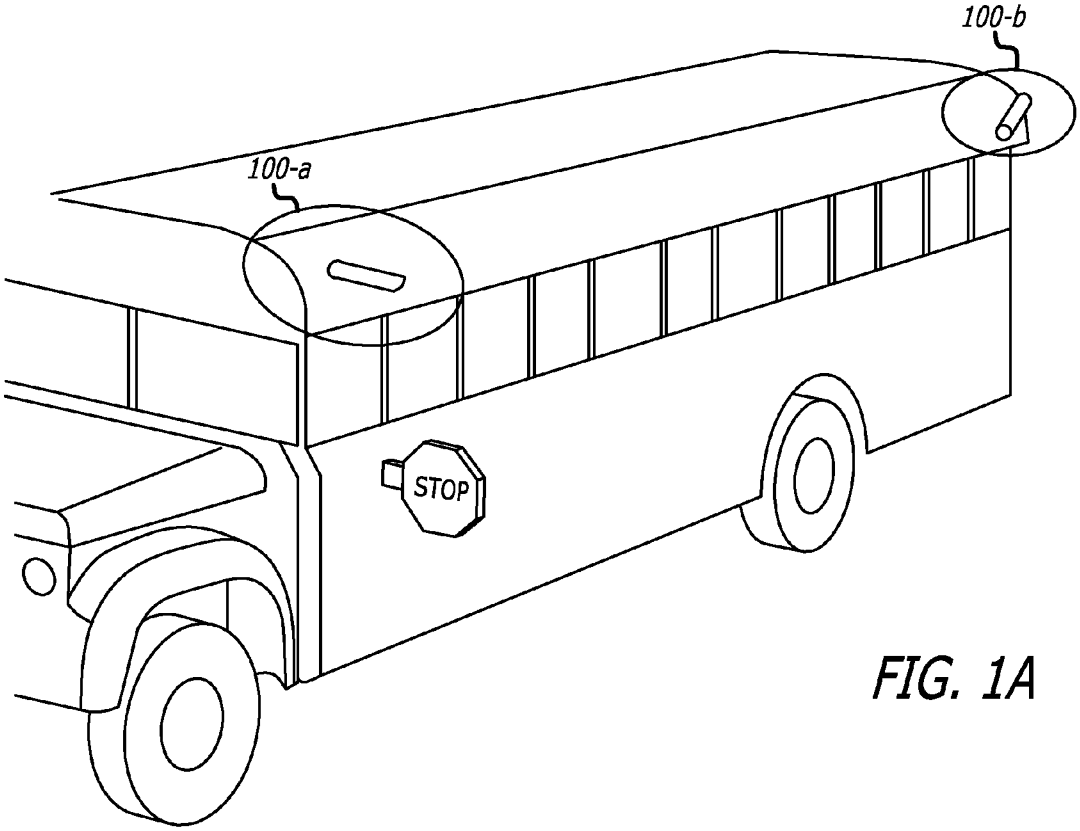
Figure 1B:
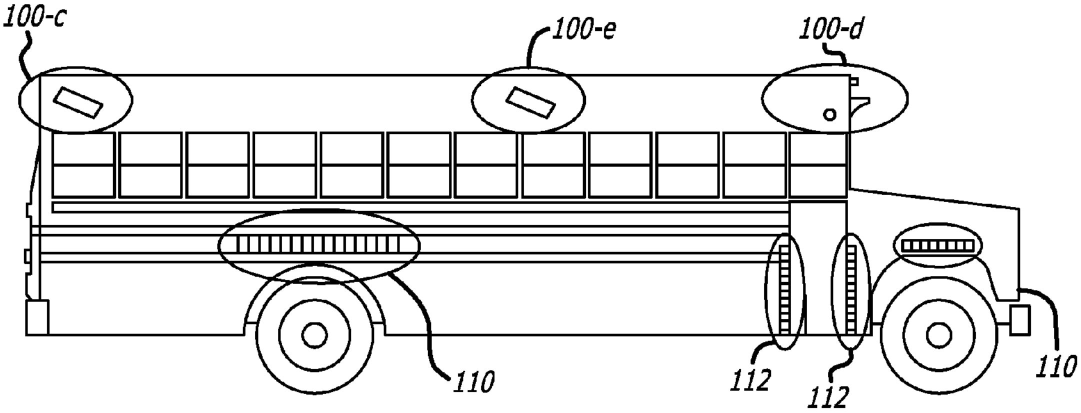
Figure 1C:
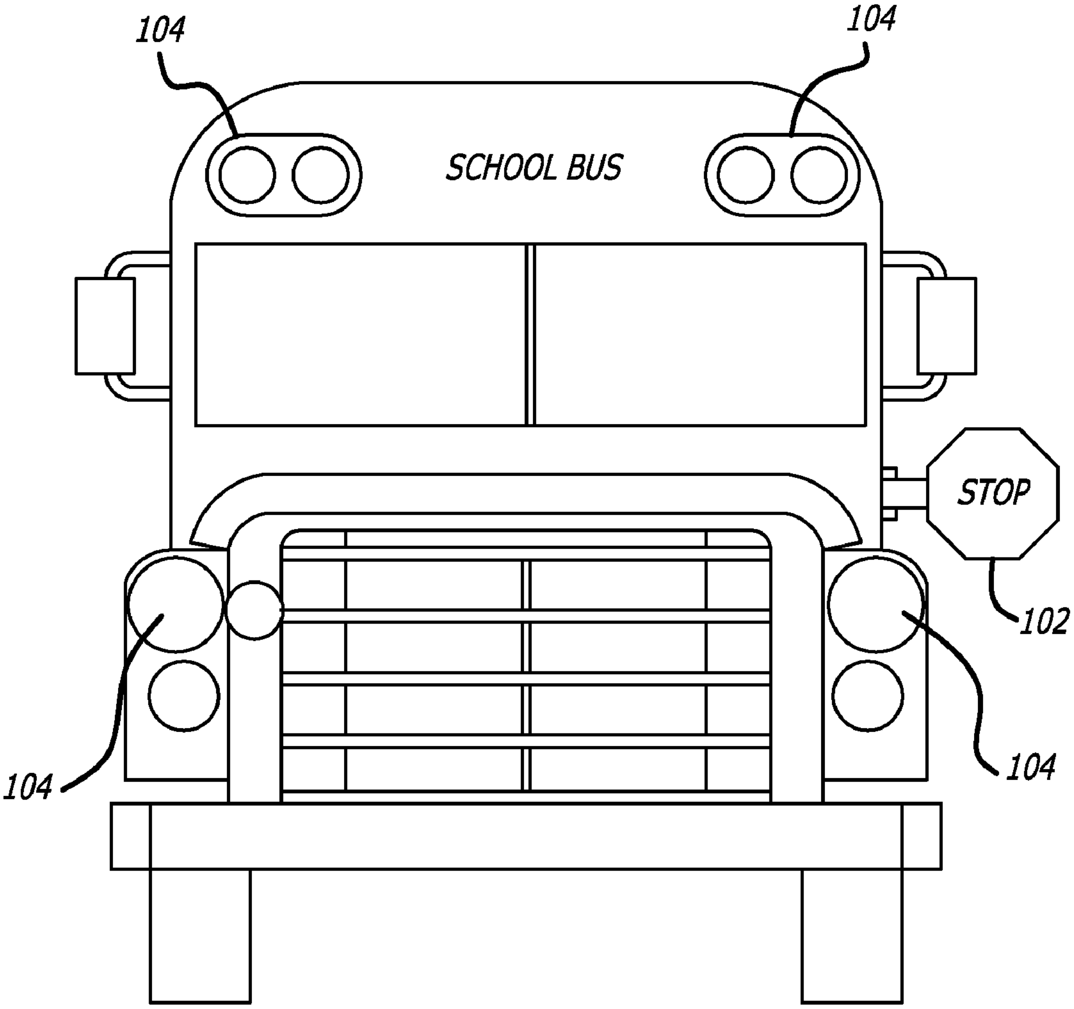

The above-mentioned features and objects of the present disclosure will become more apparent with reference to the following description taken in conjunction with the accompanying drawings wherein like reference numerals denote like elements and in which:

FIG. 1, which comprises FIGS. 1A, 1B and 1C, provides an example of camera placement in accordance with one or more embodiments of the present disclosure.

Figure 2:
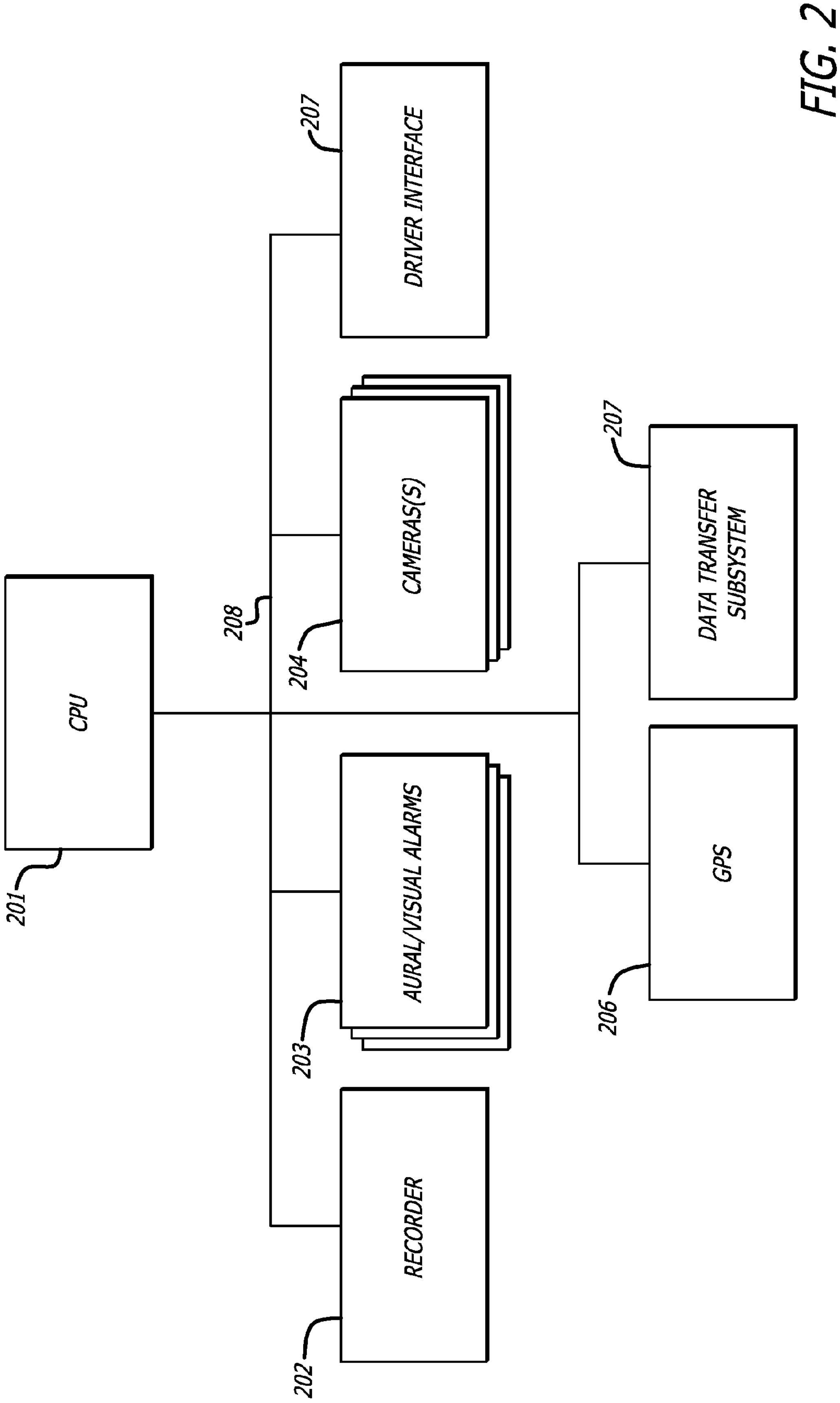

FIG. 2 provides an overview of components of a PVSS according to at least one embodiment of the present disclosure.

Figure 3:
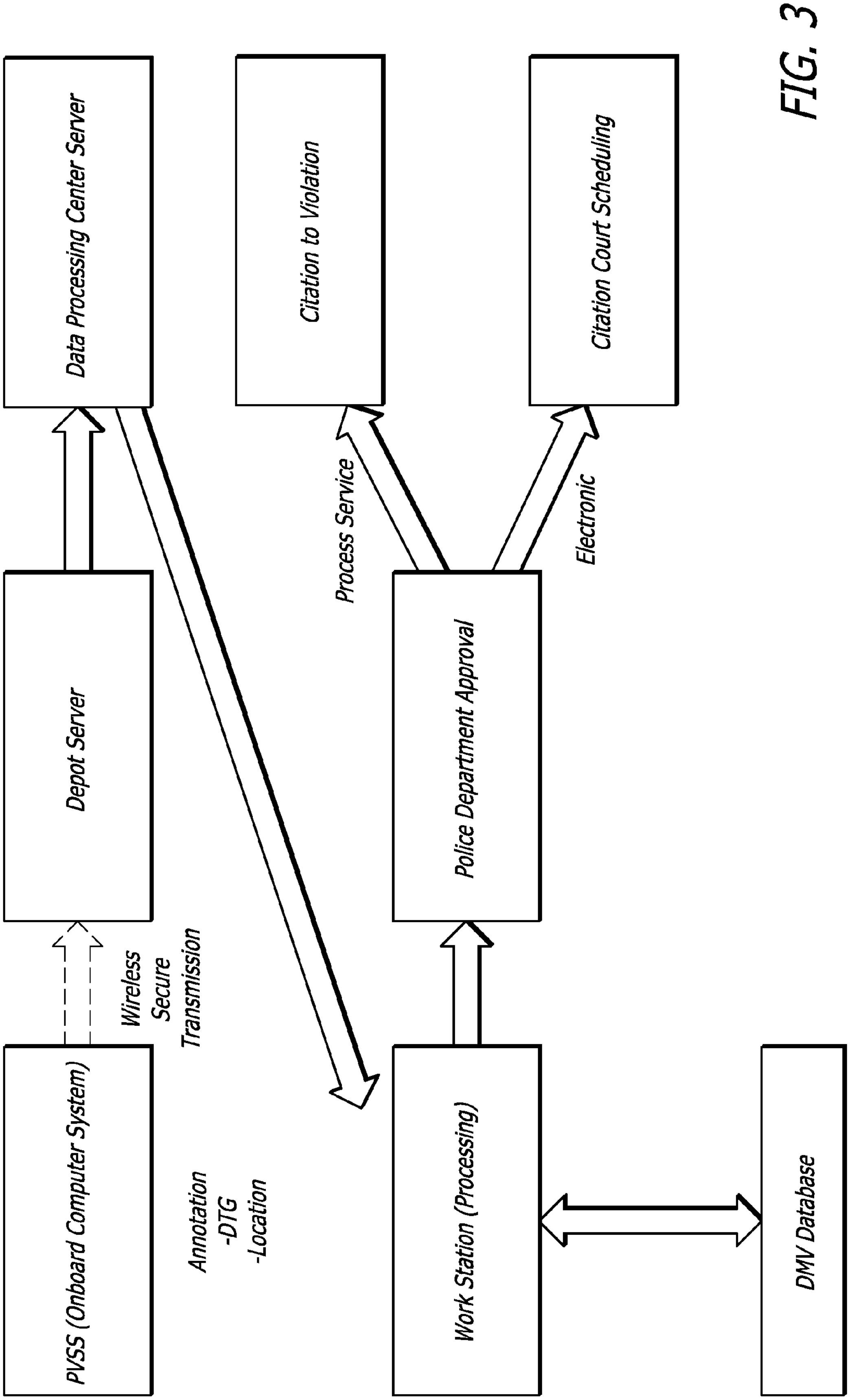

FIG. 3 illustrates a flow of data used to process a traffic violation, such as a stop arm violation, in accordance with at least one embodiment of the present disclosure.

FIG. 4 which comprises FIGS. 4A, 4B and 4C, provides an example of information, images and annotation information, which can be transferred from a PVSS for review in accordance with one or more embodiments of the present disclosure.

Figure 5A:
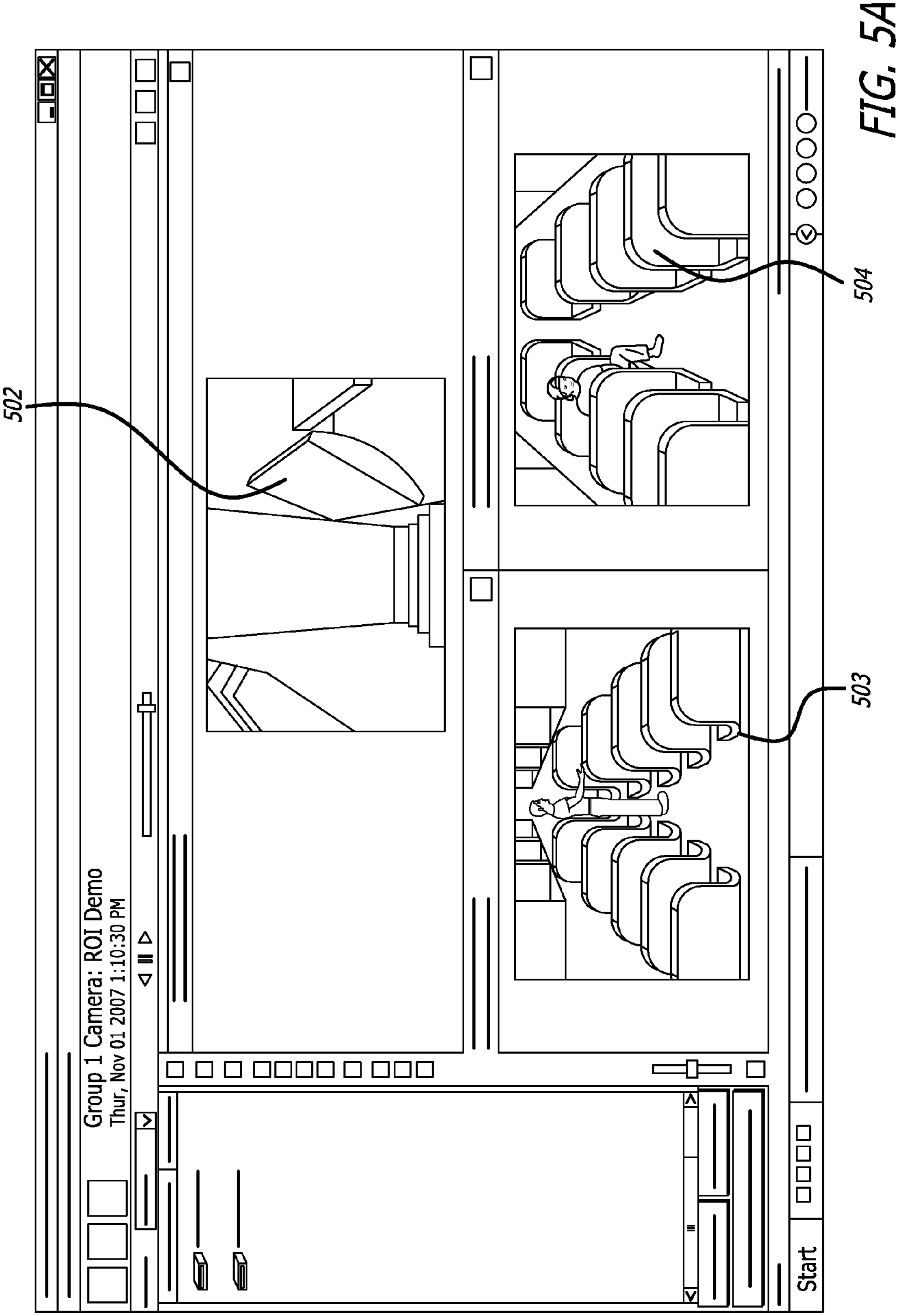
Figure 5C:
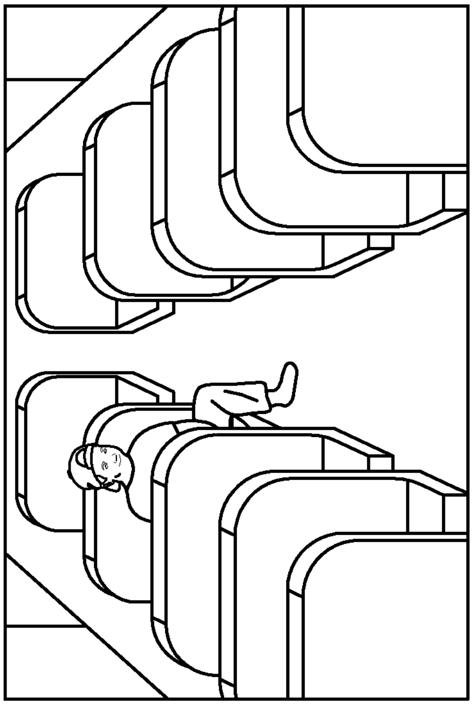
Figure 5B:
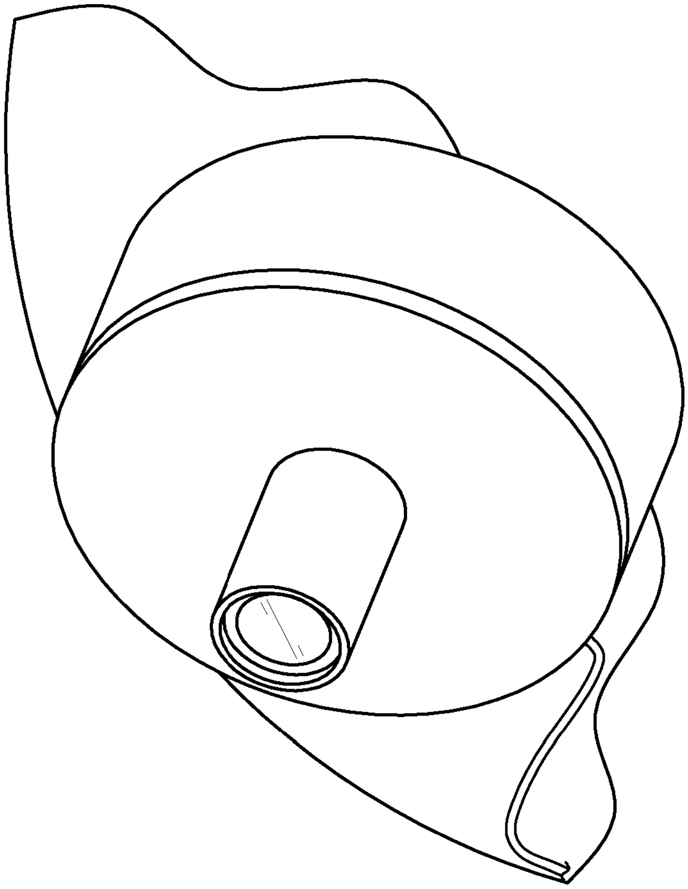

FIG. 5, which comprises FIGS. 5A, 5B and 5C, illustrate a camera, and images captured using one or more cameras of a PVSS in accordance with one or more embodiments of the present disclosure.

Figure 6:
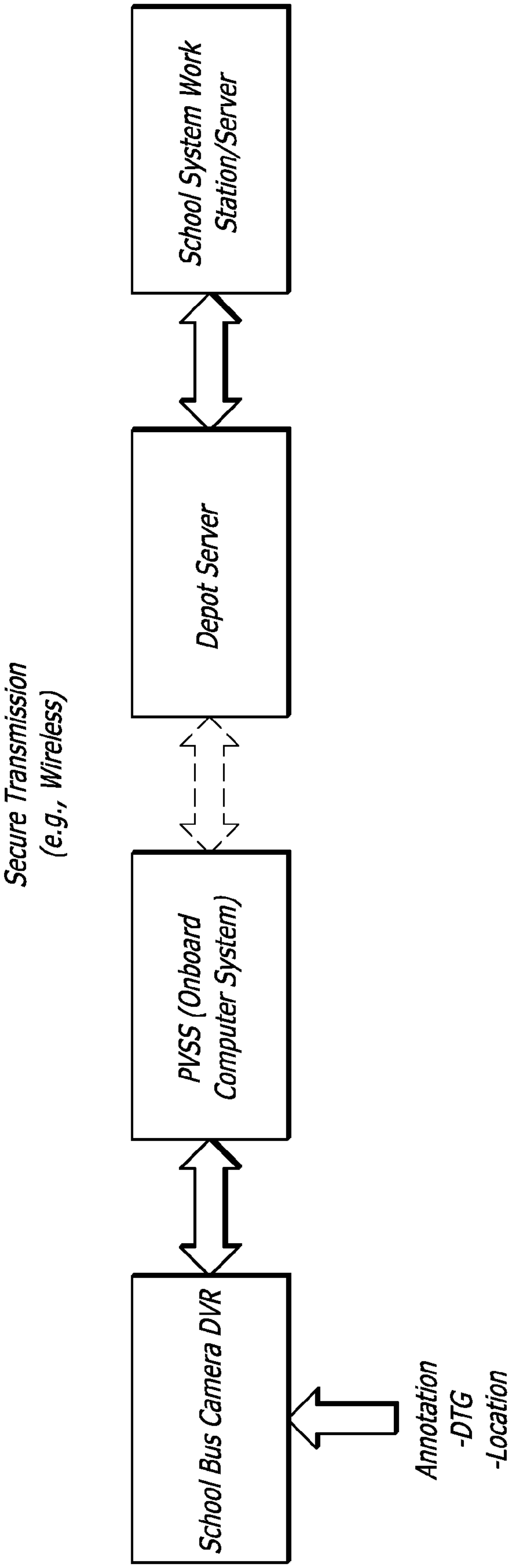

FIG. 6 illustrates a flow of data for use with an inside system of a PVSS in accordance with at least one embodiment of the present disclosure.

FIG. 7 provides a table with illustrative examples of signals input to the PVSS and signals output by the PVSS, in response to input signals, in accordance with one or more embodiments of the present disclosure.

Figure 8:
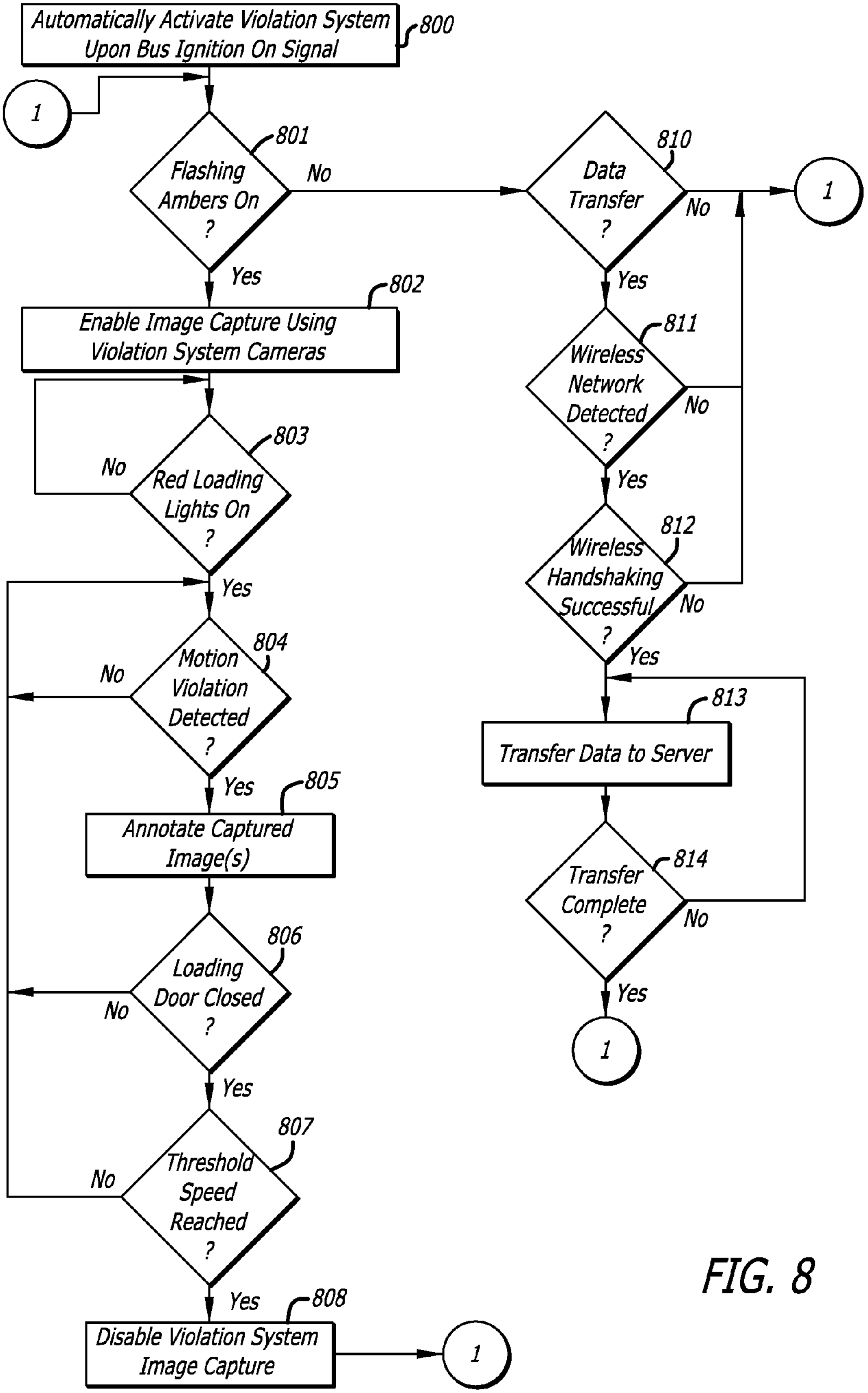

FIG. 8 provides an example of a violation side system process flow in accordance with one or more embodiments of the present disclosure.

Figure 9:
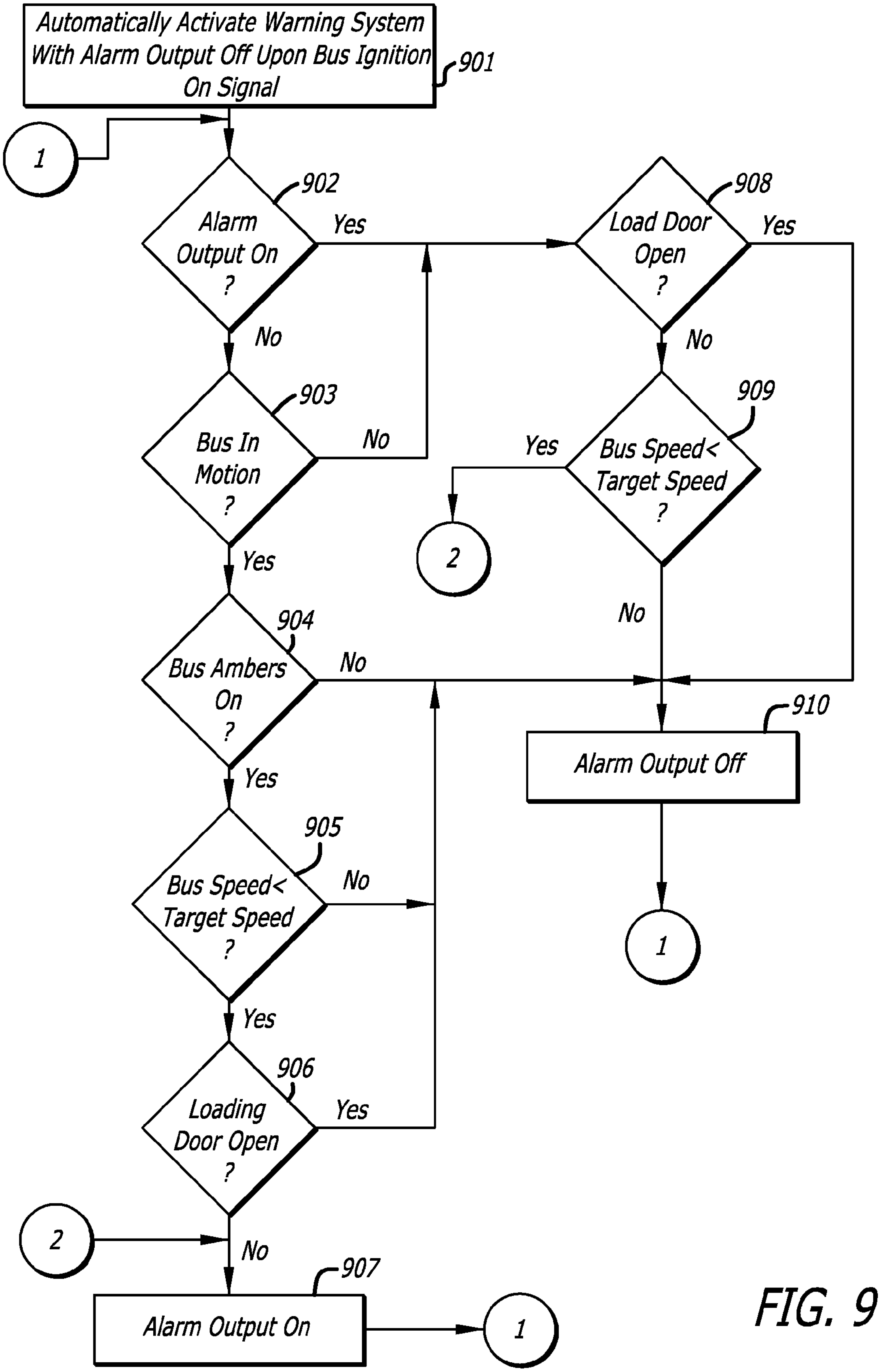

FIG. 9 provides an example of a warning system process flow in accordance with one or more embodiments of the present disclosure.

FIG. 10 provides an example of an inside system process flow in accordance with one or more embodiments of the present disclosure.

Figure 11:
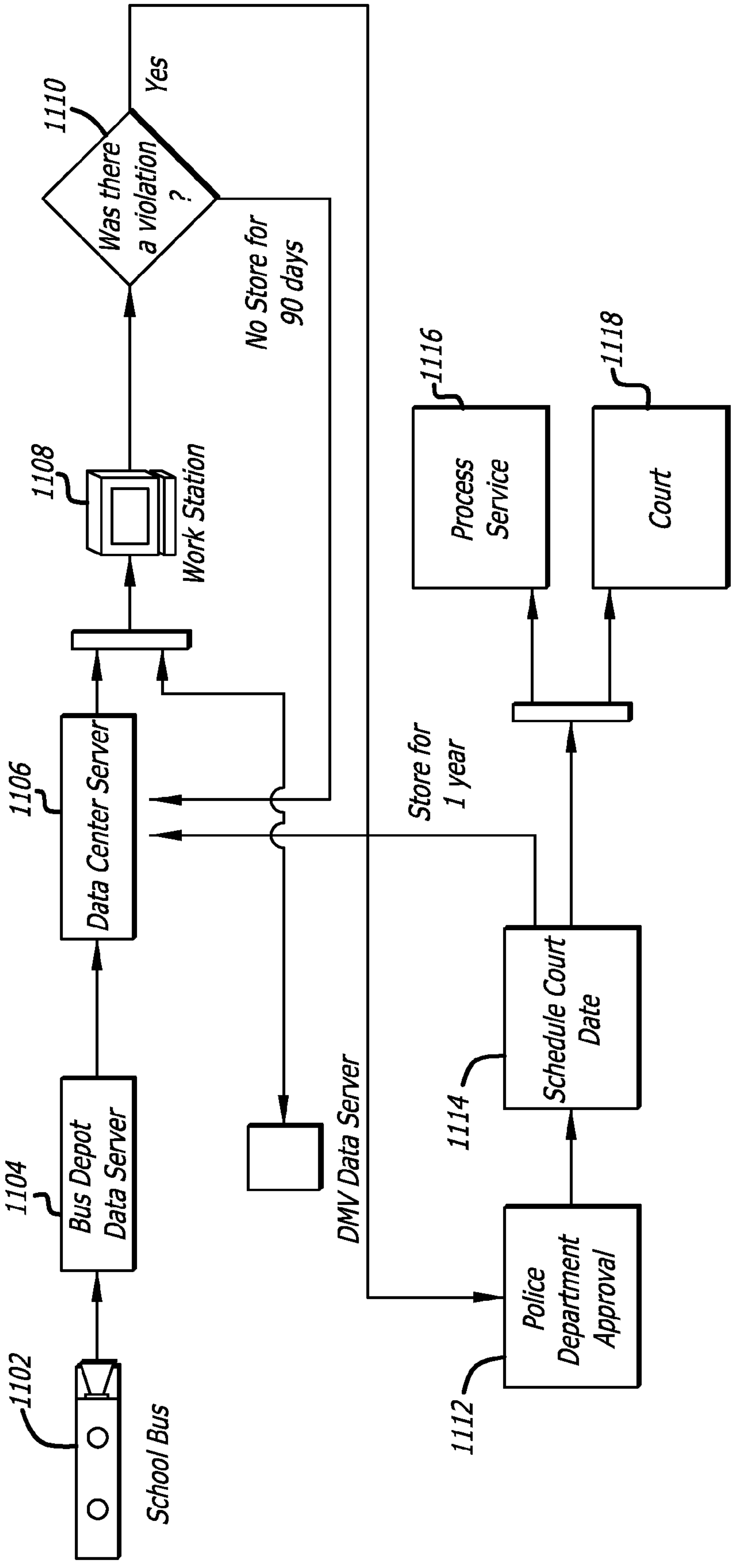

FIG. 11 provides an example of a traffic violation data flow and data retention in accordance with one or more embodiments of the present disclosure.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, biological, electrical, functional, and other changes may be made without departing from the scope of the present invention. The following detailed description is, therefore, not to be taken in a limiting sense, and the scope of the present invention is defined only by the appended claims. As used in the present disclosure, the term "or" shall be understood to be defined as a logical disjunction and shall not indicate an exclusive disjunction unless expressly indicated as such or notated as "xor."

The present disclosure provides a passenger vehicle safety and monitoring system. Embodiments disclosed can be used to improve safety associated with a PV, and to address safety problems and behavioral problems onboard PVs.

A Pv includes any vehicle used to transport passengers, including, but not limited to a PV, taxi, or van, where local, state, or federal laws regulate the operation of vehicles near or in the vicinity of the PV. Other examples of a PV include without limitation a fire response vehicle, ambulance, police vehicle, and other vehicles where local, state, or federal laws regulate the operations of vehicles near such a vehicle.

In accordance with one or more embodiments, the PVSS comprises a violation system, a warning system or an inside system. The violation system can be used to collect evidence about a traffic violation occurring in a vicinity of a PV. The violation system can be used to monitor individuals outside and in the vicinity of the PV, as well as collect evidence concerning violations occurring in the vicinity of a PV. The warning system can comprise aural and visual feedback, which can be used to warn individuals outside and in the vicinity of the PV. The intra-vehicle system can be used to monitor persons inside the PV, by the PV driver or by one or more individuals located at a facility some distance from the PV. Information captured by the inside system can be viewed in real time, as the information is being collected, or some time later, or both.

For purposes of discussion only, at the phrases are used herein, a right side or left side of a PV is from the perspective of a person, such as the driver, inside the PV and facing forward (i.e., facing toward the front of the PV). It should be apparent that a violation system and a warning system are not limited to a particular side of a PV. In fact, any side of a PV can comprise a violation system, a warning system, or both. In accordance with embodiments disclosed herein, a violation system can be located on the left side, right side or both sides of a PV, and a warning system can be located on the left side, right side or both sides of a PV. In addition and for the sake of example only, the right side of a PV, also referred to herein as the "curb" side of the PV, is the side on which passengers board and exit the PV, and the left side, also referred to as the "traffic" side, of the PV can encounter traffic and other vehicles. Of course, it should be apparent that any side of the PV can be designated a curb or traffic side.

In one or more embodiments of the present disclosure, the violation system of the PVSS monitors traffic violators who fail to heed the traffic laws related to PVs or passengers board and disembarking a PV. The PVSS employs the use of at least one camera to record information, e.g., one or more images of a driver and the license plate number of the vehicle, involved in a traffic violation in the vicinity of a PV. For example and in accordance with at least one embodiment of the present disclosure, the PVSS captures images of the driver and vehicle, in a case that the driver fails to stop when a PV stops to pick up or drop off passengers. The information captured about a violation or the individual(s) involved in the violation can be used by a law enforcement agency to prosecute the violators (e.g., issue a traffic citation, court summons, etc.). To illustrate, the drivers of other vehicles will receive traffic citations for violation of laws applicable to stopped PVs. Indeed the teachings of the present disclosure may additionally apply to the laws applicable to emergency vehicles, such as fire response vehicles and ambulances, law enforcement vehicles, and other situations where local and Federal laws govern the operation of vehicles near other vehicles.

A driver of a violating vehicle can be cited based on images captured through the use of cameras mounted on the PV, which will photograph the face of the driver and license plate of the offending vehicle to provide safety to passengers boarding or disembarking of PVs. Other evidence can be captured as well, such as flashing lights and an extended stop arm of the school PV, for example. In the case of other vehicles, such as law enforcement vehicles, the cameras may record actions near the law enforcement vehicle.

In one or more embodiments of the present disclosure, the warning system of the PVSS provides a mechanism for monitoring and alerting persons in the vicinity of (e.g., persons boarding and disembarking a PV) to the potential dangers associated with the PV.

The warning system comprises a visual warning subsystem including lights placed on the exterior of the PV and a aural warning subsystem including alarms that generate audio output. Output from the warning system (i.e., visual and aural output) can be heard/seen in the vicinity of and around the PV. In accordance with embodiments of the present disclosure, the PVSS provides a unique and timely warning to individuals in the vicinity of a PV, including an individual waiting to board, boarding or exiting a PV. In accordance with embodiments, the warning system can use visual or aural stimuli to alert an individual of a condition or situation, such as an unsafe or dangerous situation, such that the individual can take precautions. Examples of such alerts include flashing red lights, flashing amber (or yellow) lights, flashing LED array, audible alarm (e.g., two tone alarm), etc. The alerts provided by the PVSS can remain active until a predetermined condition, e.g., until the PV reaches a predetermined velocity, such as 15 miles per hour, or the PV's loading door is closed, for example. Unless otherwise specifically indicated, speed and velocity are used herein interchangeably.

In accordance with one or more embodiments of the present disclosure, the intra-vehicle system of the PVSS can monitor the behavior of individuals within the PV. For example, behavioral issues can involve one passenger, more than one passenger, or the driver. To illustrate, one passenger may be harassing one or more other passengers or the driver, or the driver may be harassing one or more passengers. To further illustrate by way of an additional, non-limiting example, someone outside the PVt may be harassing or threatening the driver or passenger of the PV. However rapidly these crimes are growing, it has been shown that monitoring the inside of the PV using video cameras serves to significantly deter the incidence of harassment. Embodiments of the present disclosure use one or more cameras mounted inside the PV to monitor activity within the PV (e.g., the behavior of the driver and passengers). Images are recorded on an appropriate media, and can be transmitted to another location for review or stored for later review. In one or more alternative embodiments, captured images can be reviewed real-time, or in virtual real-time, in addition to or in place of storing the images for later review.

According to at least one embodiment, a PVSS can be used to improve safety for passengers boarding and disembarking, or exiting, a PV by providing a disincentive to the drivers of other vehicles to violate traffic laws governing operation of their vehicles in the vicinity of a PV.

FIG. 1, which comprises FIGS. 1A, 1B and 1C, provides an example of camera placement on a PV (e.g., a school PV), in accordance with one or more embodiments of the present disclosure.

In accordance with the example shown in FIG. 1, four cameras, i.e., cameras 100-*a*, 100-*b*, 100-*c*, 100-*d*, and 100-*e*, are mounted on the PV. One camera is mounted on each corner of the PV at an elevation optimized for the collection of evidence, e.g., near the roof line. In accordance with at least one embodiment, the cameras are mounted within a metal enclosure/housing having a transparent optical window and environmental control, so as to adjust for extreme temperatures (e.g., extreme heat or cold). The cameras positioned at or toward the front of the PV, i.e., cameras 100-*a* and 100-*d*, are pointed toward the rear of the PV. The cameras positioned at or toward the rear of the PV, i.e., cameras 100-*b* and 100-*c*, are pointed toward the front. In this manner, there is always a camera pointed at both the front and rear of the PV. Each external camera can trigger a stroboscopic light source situated so as to provide optimum illumination for facial or license plate imaging.

As part of the violation system, one or more cameras on the left side of the PV, e.g., cameras 100-*a* and 100-*b*, can be used to capture information related to street-side or traffic violations/violators. For example, one or more cameras of the violation system, can capture images of the PV, the license plate and driver (e.g., face) of the vehicle, such as a vehicle in an adjacent or other (e.g., a lane other than an immediately adjacent lane, on the same or opposite side of the street as the PV) lane, involved in a traffic violation. One example of such a traffic violation contemplated is illegally passing a PV which is displaying at least one "passenger loading/unloading" signal. Images can be captured of the passenger vehicle's flashing lights or extended stop arm as part of the evidence collected, for example. In addition to captured images, embodiments of the present disclosure can capture information regarding a state of one or more components of the PV at the time of the violation. For example and without limitation, information indicating the st ate of flashing lights on a PV can be determined and saved. Such information can be retrieved from a signal output by a component of the PV to activate an indicator used to notify the PV driver of a state of the flashing lights. One example of such an indicator can be, without limitation, a visual indicator on, at, or near the dashboard of the PV, which is lit when the flashing lights are on. Thus and in accordance with one or more embodiments, for example, one or more images of a stop arm can be captured, as well as information indicating whether flashing lights are activated. Other information can include, without limitation, a time and date that the "flashing lights" signal was output by the PV (e.g., a date and time that the flashing lights were activated), for notification to the PV driver.

In addition, cameras 100-*a* and 100-*b* can be used to cover any number of lanes of traffic, and in one or more embodiments, a three-lane coverage is used. To further illustrate in a case that the right side of the PV, one or more cameras, e.g., cameras 100-*e* and 100-*d*, on the right side of the PV can capture one or more images on the curb side, so as to assist in determining whether it is safe for loading and unloading passengers, or safe for other persons in the vicinity of the PV. Camera 100-*e* is positioned to capture images at or near the door of the PV.

One or more such cameras can capture persons in the vicinity of the door or record someone as they board or exit the PV, for example. A camera, e.g., a wide-angle camera, can be positioned at the front of the PV, e.g., at a forty degree angle, so as to capture an image of someone in front of the PV (e.g., crossing in front of the PV). In addition, a camera can be positioned toward the back of the PV facing forward, so as to capture an image of someone alongside the PV. A monitor can be used to display images captured by one or more of the cameras positioned inside or outside the PV. For example and without limitation, images displayed on the monitor can assist the PV driver in determining whether someone is crossing in front of the PV or has not yet cleared the vicinity, so as to assist the PV driver in determining whether it is safe to move. In addition, the monitor can display images captured by cameras within the PV. The monitor can comprise multiple regions, each having the ability to display a captured image.

Many types of cameras can be successfully used to accomplish the teachings of the present disclosure. According to embodiments, Lumera Corporation model Le375 is used to capture an image of a license plate or a driver. It should be apparent, however, that other cameras manufacturers and models that can be used to record information, such as a license plate number or a face, evidencing a violation.

An exemplary camera collects images at a rate of about ten frames per second, while activated. Such an exemplary camera can detect motion, or capture images that can be used to detect movement, or motion. It should be apparent that a motion detection component can be separate from the camera, or cameras, that capture the images.

Embodiments disclosed herein can detect motion using captured images, for example, by examining successive images captured to detect differences indicating movement within a scene. Each image can be subdivided into a number of subsections, or segments, with a given segment being compared to a corresponding segment of another captured image. For example, an image can be subdivided into 100 segments. Some or all of the 100 segments can be used to detect motion. For example, segments considered to contain a violator (e.g., segments in the lower half of an image) can be used to detect motion. Each segment of an image being used to detect motion is compared with a corresponding segment of another image. Motion is detected when differences between image subsections compared exceed a selected threshold. The threshold can be configured or parameterized for access by the PVSS, for example. For example, there can be motion detection based on the number of segments determined to differ in a comparison of segments from at least two images. Motion can be determined to exist in a case that a number of differing segments exceeds a threshold. To illustrate and assuming that an image is subdivided into one hundred segments all of which are used to detect motion, motion can be determined to exist in a case that at least one-third of the segments are determined to differ across the images.

In addition, or as an alternative, to analyzing captured images to detect a moving vehicle, an electromagnetic or acoustic sensor can be used. One or more sensors can be positioned on the PV to detect when movement of an object across a "plane" (or "fence").

Once motion is detected, one or more cameras of the violation system can be triggered to capture violation imagery (e.g., images of the license plate, driver, etc.), as well as annotation information, according to embodiments.

Detected motion, above a selectable threshold, can be used to identify a moving vehicle and to cause a set of image frames to be captured. In accordance with one or more embodiments, a captured image can be annotated for subsequent analysis. However and as previously indicated, cameras need not detect motion. In such a case, for example, a device external to the camera can be used to analyze images captured by one or more cameras, to detect motion. Of course, it should be apparent that more than one camera can be used to detect motion/movement, and that, in a case that multiple cameras are used, the output of each camera can be used separately or in some combination to detect motion/movement. Alternatively, the cameras may be configured to be "always on," according to embodiments.

A camera can be activated and can record each frame as a function of time. For example, a camera can be activated and can capture frames, at a predetermined rate, which frames can be forwarded to another device for analysis and detection of motion or movement. In accordance with one or more embodiments of the present disclosure, the camera is activated during a predetermined period, including while the PV is stopped.

In at least one embodiment, an exemplary camera has the capacity to store approximately 240 frames of imagery. In one or more embodiments, when a moving vehicle is detected, about 10 frames of imagery are captured using at least one camera at various times, such as before, during, and after the event. In addition and in accordance with at least one embodiment, the image can be annotated, which annotation can include the date, time and location (e.g., GPS location information) of the event as well as the time that the PV stop arm was extended and the flashing lights were activated. Other information is likewise contemplated, such as traffic condition, weather conditions, etc., that would be helpful to law enforcement officials in identifying traffic, or other offenses, or offending persons/vehicles. The annotating information can further include signals received from components of the PV, which indicate the status of the stop arm, flashing lights, etc. GPS data can also be used to trigger an alarm at the remote location (e.g., a PV depot) in a case that the PV moves out of a predetermined geographic area, or beyond a certain boundary.

FIG. 2 provides an overview of components of a PVSS according to at least one embodiment of the present disclosure. The PVSS comprises computing system 201, which is also referred to herein as a central processing unit (or CPU), a controller, or processing unit, aural or visual alarms 203, which can operate in parallel, one or more cameras 204, some or all of which can be a motion-activated camera, one or more analog or digital recorders 202, GPS system 206, data transmission subsystem 207, such as a wireless fidelity, "WiFi," data transmission subsystem, and an operator interface unit (not shown). The components of the PVSS communicate via a communication mechanism, such as internal data bus 208, or other comparable communication/interface mechanism.

In accordance with at least one embodiment, a system computer 201 is used to control the PVSS, provide a system self-check function, or to provide feedback to the PV driver to assess whether the system is functioning properly. In accordance with at least one embodiment, such a system computer 201 is a Siemens Corporation Industrial PC (Microbox). It should be apparent that other system computers can be used with embodiments of the disclosure. For example, a general purpose computing system, or industrialized computing system, such as any personal computer system, for example, can be used with the PVSS. In accordance with one or more disclosed embodiments, the computing system can be configured to provide capability now known, or needed for future expansion and enhancement. Such expansion or enhancement can include expansion/enhancement to address homeland security requirements, for example.

The system computer 201 is also used, in accordance with one or more embodiments, to transfer information obtained from the PVSS or installed components to remote store. In at least one embodiment, the computer 201 includes a capability to transfer the information via data transfer subsystem 207. For example, the data transfer subsystem 207 can include a WiFi component to connect to a wireless network, e.g., using the IEEE standard 802.11 or 802.3 protocol, or to connect to a wired network, e.g., using an Ethernet connection (not shown), for example. Using a networking component, the PVSS can be connected (e.g., via a wired connection, a wireless connection, or both) to an external system, e.g., a server external to the PVSS, such as a server located at the depot, for transferring information to or from the PVSS. In accordance with at least one embodiment, the PVSS uses the networking connection to transfer data captured by the PVSS, including evidence of a possible traffic violation. The information is transferred to external storage when the PV returns to a garage or other depot, at which the PV is stored when not in use, for example.

Using a PV as an illustration, for example, when the PV returns to the PV depot, the WiFi component of the PVSS can be used to transfer data from storage on the PV, e.g., a magnetic disk drive or other storage medium, onto a depot server. Alternatively and generally, data transfer may be accomplished in multiple ways including by transfer to portable media, for example, flash media or floppy disk; by use of a wireless communication device, via a 802.11 network protocol for example; by a wired communications device, using a 802.3 network protocol for example; or by other means or methods (e.g., a dedicated T-1 data line) for transferring data from one computer system to another. It should be apparent that any data transfer mechanism can be used, alone or in some combination to transfer data.

In accordance with at least one embodiment, the WiFi component employs multiple, independent radio frequency channels (e.g., twelve channels). Multiple antennae (e.g., in a depot or garage housing the PV) are used to provide overlapping coverage of the area and the entrances. For example, one antenna can be located in each corner, and one or more in the center of the area used to park or stand the PVs. The WiFi initiating component, e.g., the WiFi component portion of the PVSS, automatically selects the channel and antenna combination that provides the best signal quality based on testing signal strength and error rate. If the signal quality drops below a predetermined threshold (which threshold is configurable), the PVSS can automatically select a different antenna/channel combination.

In addition and for purposes of privacy and preservation of a chain of evidence with respect to the data captured, the PVSS can implement data security. For example, encryption can be used to secure the data, either while it is retained in storage on the PV by the PVSS, prior to the data being transferred by the PVSS to server storage, or while in server storage. Any number of encryption schemes can be used to secure the data. For example and according to embodiments of the present disclosure, a combination of spread-spectrum transmission and data encryption can be used for data security. The system computer 201 resident on the PV can contain an encryption algorithm that encrypts the data. The data can be stored or transferred in an encrypted form. In addition, the devices used to capture the data (e.g., a digital video recorder or camera) can include an data encryption module, which encrypts the data prior to storing or transferring the data. In the case of a wireless transfer, for example, spread-spectrum technology can be used to prevent or detect unauthorized data access or tampering.

Images captured by camera(s) 204 are conveyed to a storage media. According to embodiments, the images captured by camera(s) 204 are stored using digital video recorder (DVR) 202, for example a March Networks Corporation 5308 DVR. DVR 202 can capture both still images, or video and audio, in accordance with one or more embodiments. DVR 202 can be configured to encrypt the data captured by the device. DVR 202 can be selected to withstand environments such as may be encountered by a PV, DVR 202 can be selected to have sufficient capacity to simultaneously record the images of all camera(s) 204 at a minimum of four frames per second, for example. In accordance with at least one embodiment, four frames per second is considered an adequate capture rate to define expected motion. The 5308, for example, can record up to fifteen frames per second from each of cameras 204. Depending on the hardware selected multiple DVRs 202 may be necessary. In accordance with one more embodiments, at least two audio channels can be concurrently recorded. Audio from front camera 204 and audio from rear camera 204, e.g., the front and rear cameras being inside the PV, can be recorded using the two audio channels, so as to capture student and driver verbal communication, on a bus for example.

At least one DVR 202 can be selected to record at least 180 hours of video and sound footage. Alternately, DVR 202 data can be transferred to external storage located either on the PV, or at the PV depot, or it may be periodically offloaded by switching out DVR 202 storage media periodically. In at least one embodiment, DVR 202 stored data can be searched by date and time for incident investigation, and data stored on DVR 202 can be password protected, encrypted, or both. In the event that the PV does not return to the depot due to accident or mechanical failure, the storage media may be removed from DVR 202 by a service technician and returned to the depot.

In addition and in accordance with one or more embodiments, while not shown, the PVSS can use/include a portable media reader, such as floppy disks, writable CDs and DVDs, flash based media, or other devices for transferring data from one computer to another computer.

GPS system 206 such as an embedded PC-104 Trimble Navigation GPS, which provides such data as date, time, and location, which can be used to annotate, or in some manner supplement, captured imagery, or can be used independent of captured imagery. Alternatively, GPS system 206 can be provided by a device external to computing system 201. In such a case, an interface between GPS system 206 and computing system 201. Although not shown, the PVSS includes one or more interfaces with components installed on the PV, so as to allow such components to provide as input, or otherwise signal, a condition or event, such as flashing light activation, stop arm activation. Such input can be used to activate components of the PVSS, such as the camera used to detect movement/motion or capture violation imagery or any other device used to capture information about a violation, for example.

In accordance with at least one embodiment, one or more cameras 204 can be activated when the PV driver activates a switch, such as a switch to activate flashing amber lights for example, which results in one or more lights (e.g., one or more of lights 104) to flash as a warning, or controls the positioning or extension of stop sign 102, such as when the PV approaches a loading or unloading zone, or opens a door. Alternatively, and when the PV slows down to a stop, a component installed on the PV can cause the lights to flash to indicate that it is stopping. These signals indicate to other drivers that passengers are boarding or exiting the PV. Cameras 204 can be deactivated when the PV driver closes the loading door or deactivates the flashing warning lights or stop sign, the PV reaches a predetermined speed threshold (which threshold is configurable), or other similar criteria. When a driver fails to yield or stop for the PV while the PVSS is activated, cameras 204 photograph the face of the driver and license plate of the driver's car for example. As discussed earlier, multiple pictures may be taken, for example, 10 frames, to facilitate identification.

In accordance with at least one embodiment, the depot server may be any server capable of receiving data transferred from PV storage. According to embodiments, the depot server uses a wireless network to establish a connection with each PV as it returns to the depot and initiates a data transfer to the depot server. A suitable depot server is, for example, a DELL Corporation, 500 Gigabyte server, and includes fault tolerate storage, such as a Redundant Array of Independent/Inexpensive Disks (or RAID), Multiple wireless network access points can be used to ensure that sufficient channel capacity exists to transfer all collected data. In the event that the data on a PV has not completed transferring before the driver leaves the PV, the PVSS (e.g., data transfer subsystem 207 and computing system 201) on the PV can stay active until the transfer is complete. Computing system 201 can be configured to deactivate the PVSS once the data transfer is complete, even in a case that the PV driver is no longer on the PV.

In accordance with one or more embodiments, a wireless networking and multiple 802.11 channels can be used in an open are to eliminate dead zones and contentions between multiple nodes, so as to achieve a wide coverage area. Nodes covering the same are will use sequential odd and even channels to provide the coverage without dead zones thereby avoiding contention in areas of antennae overlap. Nodes and PV 802.11 channels can be encrypted using hardware modules to prevent unauthorized data access.

Data transferred from a PV to an external server can be stored or processed by the server, or other computing device. For example and in the case of processing information associated with a traffic violation, the data can be processed by the depot server, or other computer system, to select at least one picture of the driver and at least one picture of the driver's license plate that clearly shows both the driver and license plate. The photos and other data, such as speed, GPS location, time, and date are then used to issue a traffic citation to the driver. It should be apparent that the information collected by a PVSS can be used to any purpose, including any purpose that improves monitoring and safety of individuals connected in some manner with a PV. In addition and although it is assumed that a citation will be issued to a violator identified using information collected by a PVSS, it should also b e apparent that a warning could be issued.

FIG. 3 illustrates a flow of data used to process a traffic violation, such as a stop arm violation, in accordance with at least one embodiment of the present disclosure.

Information captured by a PVSS, such as still or motion imagery and annotating information (e.g., date-time group, DTG, or other date/time information, GPS information, etc.) is transferred from PVSS storage to an external computing system, such as a depot server. The still or motion imagery can include images from within and outside the PV. Some or all of the information transferred from the PVSS is then transferred to a data processing center server via any data transmission mechanism, such as for example, a dedicated T-1 data line, and including any data transmission technique mentioned herein.

For example, According to embodiments, images associated with a traffic violation, or other infraction, as well as any desired annotation data, are transferred from the depot server to a data processing center server. In a case of a traffic violation involving another vehicle and its driver, the images can include one or more images of the driver and vehicle's license plate. The data processing center server can be a computer, such as a DELL Corporation Expandable Clustered Archival System, which can in include a database management system such as MS SQL or an equivalent.

The data can reside in the server until accessed by a workstation terminal at the data processing center. The workstation terminal operator reviews an event package consisting of, for example, image data and annotation data. FIG. 4 which comprises FIGS. 4A, 4B and 4C, provides an example of information, images and annotation information, which can be transferred from a PVSS for review in accordance with one or more embodiments of the present disclosure. Such information can be packaged or reviewed by a data processing center operator, for example.

Referring to FIG. 4A, for example, the package can include one or more images of the offending vehicle and license plate. In addition and although not shown, the package can include one or more images of the driver. FIGS. 4B and 4C provide examples of information which can be used to identify the location, such as by street map or by coordinate system (which can be determined using GPS system 206 or other GPS unit coupled to the PVSS, as discussed herein). The contents shown in FIGS. 4B or 4C can be combined with that of FIG. 4A to form an integrated image. For example, the information of FIG. 4B can be superimposed over a portion of the image shown in FIG. 4A. Similarly, the map shown in FIG. 4C can be superimposed on a portion of the image shown in FIG. 4A.

Referring again to FIG. 3, the operator selects the license plate image and the driver facial image that most clearly identifies the vehicle and driver. The operator can query an appropriate record keeping institution database (e.g., a state's department of motor vehicle agency database, state or federal law enforcement databases, etc.) to retrieve the driver and registration data corresponding to the vehicle license plate. The data including the driver and license plate images can be automatically transferred to a preformatted citation form. In a case of a criminal violation, the data processing center computer can further select a court date for the appearance of the offender, which date can be entered onto the citation to be served to the offender as well as electronic transmittal of the offender's name and court date to the court. In a case of a civil violation, the citation package can comprise a traffic violation notification, e.g., ticket together with one or more images of the traffic violation with annotating information. The civil traffic violation notification is mailed to the offender, or violator. Prior to transmittal to the court or to the offender, the entire citation package can be sent to the appropriate police department for review and approval either electronically or by conventional methods such as by mail or courier.

In accordance with at least one embodiment, in an event that a PV does not return to the garage/depot due to mechanical failure or accident, the storage media containing data can be removed and returned to the depot by a service technician. In such a case and in accordance with one or more embodiments, the data stored in the storage media is encrypted, so as to secure the data. It can also be transmitted to an appropriate server via a wireless network or by transferring the data to a suitable portable storage device, such as flash media, floppy disk, writable CD or DVD, and other portable storage devices known to a person of ordinary skill in the art.

In accordance with one or more embodiments, the PVSS can be used alone or in conjunction with one or more other systems, as a warning system to aid in the prevention of injuries or death to individuals in the vicinity of, or passengers boarding or exiting the PV. Safety measures may include visual and aural devices. Signals communicated to passengers, as well as motion sensors (e.g., within and under the PV) and cameras attached to small displays that the PV driver may view prior to moving the PV, are employed as examples of the visual and aural devices.

For example, in at least one embodiment and to illustrate with respect to a school PV, as the school PV approaches a stop, flashing warning lights are activated and when the speed of the PV drops below a predetermined speed, such as, for example, 15 MPH, a sensory warning system is activated, which can include audible warnings, visual warnings or both. The speed of the PV can be determined using input from GPS system 206, or an external GPS unit, for example, or from a component of the PV that monitors speed. The audible warning device can comprise an 87 db Federal Signal Systems Inc. two tone alarm that produces a loud, unique warning sound or any other audible, or aural, warning device that would be common to a person of ordinary skill in the art. The aural system may be designed to be unique and can be used in conjunction with indoctrination training to alert passengers to such warnings, and what to do in the event of such a warning. Moreover, in at least one embodiment, multiple sound patterns may be used, for example, immediately prior to movement of the PV, the sound may be altered to alert the student that loading or unloading is complete and the PV is prepared to move. Contemplated changes include changing one or more of the sound pattern, tempo, or volume, as well as other variations that would be known to a person of ordinary skill in the art.

In at least one embodiment, warning lights can be used, either alone or together with aural warnings, to alert individuals to the dangers associated with the PV. FIG. 1B provides an example of placement of warning lights on a PV in accordance with one or more embodiments of the present disclosure. Lightbars 110, such as 52 inch Federal Signal Systems Incorporated LED light bar arrays, can be placed over the wheel wells on one or the other or both sides of the PV. In addition, LED arrays, such as LED arrays 112, can be placed on either side of the loading door. One example of an LED array that can be used with embodiments is a 4-inch rectangular LED array. It should be apparent, however, that any type of light array, or additional light arrays, can be placed on the PV. For example, although not shown, LED arrays can be located on the front corners of the PV to warn passengers waiting at the PV stop as the PV arrives. In addition or alternatively, amber lights 104 of FIG. 1C can be activated, e.g., turned on or caused to flash, in order to warn passengers of the arrival of the PV. Passengers can be instructed to avoid the PV and roadway when they hear or see the alarms. According to embodiments, the pattern of the lights, sounds, or both can be software selectable.

In one or more embodiments, the warning system can be activated at PV stops and continues to be activated as the PV begins to move. The alarm system continues to function until the PV accelerates to a set speed, for example, 15 MPH, after which it is deactivated. Nevertheless, an embodiment optionally comprises a driver initiated override of the activation state.

In accordance with one or more embodiments, the warning system is controlled automatically via computing system 201. However, embodiments of the present disclosure also contemplate manual activation, deactivation, or a combination thereof.

According to embodiments, the warning system is controlled by computing system 201, such as the one discussed herein, e.g., a Siemens Microbox system computer, using the PV warning and loading light inputs, as well as speed from the GPS. Computing system 201 executes one or more software computer programs, one or more of which can be used to control the aural or visual alarms so as to prevent them from being activated at other than at student loading stops. For example, computing system 201 can control the aural or visual alarms to prevent them from being activated as a traffic control stops or a railroad crossing.

In one or more embodiments of the present disclosure, an inside, or intra-vehicle, system can be used to monitor activity inside and in the vicinity of a PV, in accordance with one or more embodiments. Such a system can be used as a monitoring system to monitor behavior inside the PV or to aid in deterring unacceptable behavior, such as incidents of harassment and other incidents, which may occur inside a PV, for example. FIG. 5, which comprises FIGS. 5A, 5B and 5C, illustrate a camera, and images captured using one or more cameras of a PVSS in accordance with one or more embodiments of the present disclosure.

It should be apparent that the present disclosure contemplates using any number of, as well as different types and models of, cameras 204. FIG. 5B provides an illustration of camera 204 mounted inside a PV in accordance with at least one embodiment of the present disclosure. The intra-vehicle monitoring system can be implemented using camera 204, such as the General Electric VR4-310. For purposes of an example only, one camera 204 can be mounted over the driver's position looking down the loading stairs at the loading door, one camera 204 can be mounted at the front of the PV looking toward the rear of the PV, and one camera 204 can be mounted at the rear of the PV looking toward the front.

FIG. 5A provides an example of a user interface displaying images captured from cameras used by one or more embodiments of the present disclosure. Image 502 provides an example of an image captured by camera 204 mounted over the driver's position looking down the loading stairs at the loading door. Image 503 is an example of an image captured by camera 204 mounted at the rear of the PV looking toward the front. Image 504 is an example of an image captured by camera 204 mounted at the front of the PV looking toward the back. Image 502, which is shown in FIG. 5B, provides an example of an image captured by camera 204 mounted at the front of the PV looking toward the rear of the PV.

In accordance with one or more embodiments, camera 204 can be mounted at the midpoint of the PV looking toward the rear. Other configurations are contemplated, which can be based on, for example, on the particular PV or desired degree of monitoring.

Camera 204 with high sensitivity (low lux number) can be used inside the PV, in order to accommodate low light level conditions within the PV. The camera sensitivity can be approximately 0.3 lux to permit low light imaging. In embodiments, multiple instances of camera 204 are positioned to minimize blind spots. Each camera 204 may be mounted in a tamper-proof steel housing with a poly-carbonate window and all camera wiring is routed in an inaccessible manner. Moreover, embodiments also contemplate additional instances of camera 204 that may be installed on the outside of the PV to monitor incidents occurring immediately prior to boarding or after exiting the PV.

According to embodiments, cameras 204 mounted inside the PV may be combined with motion detectors, as previously described. Thus, if a passenger is trapped on the PV after the PV has returned to the PV depot or at any other time, the camera will be activated and an appropriate party may thereby receive notification. Similarly, persons on board the PV illegally will be detected and the proper authority may be notified. Accordingly, upon activation of camera 204 in PV depot, data transfer subsystem 207 could be activated to broadcast the contents of camera to the appropriate party or trigger a notification, such as an alarm, email, text message, or automated phone call, to be sent to a responsible party.

According to embodiments, one or more hidden cameras may be placed on a PV to monitor emergency situations, such as terrorist threat, and connected to a safety center.

FIG. 6 illustrates a flow of data for use with an inside system of a PVSS in accordance with at least one embodiment of the present disclosure. Information captured by a PVSS, such as still or motion imagery and annotating information (e.g., date, time, GPS information, etc.) is transferred from PVSS storage to an external computing system, such as a depot server. The still or motion imagery can include images which capture behavior of persons inside the PV, or persons boarding or disembarking the PV, for example. Some or all of the information transferred from the PVSS is then transferred to a data processing center server via data transmission subsystem 207, using any type of data transmission mechanism, including a dedicated T-1 data line, or any of the other data transmission mechanisms now known or otherwise determined.

In accordance with one or more embodiments, program code described herein is executed by computing system 201 to control the PVSS. The software specified can be modular and structured in such a way that inputs and outputs to each individual software module are clearly defined. In one or more embodiments, the program code includes at least five integrated software modules: (1) an interface module (2) a vehicle speed monitoring module, (3) a logic module (4) a memory and recording module and (5) a built-in-test (BIT) module.

The interface module accepts switch signals from the PV and routes them to other appropriate software modules. The inputs from the PV include: (1) "Loading Door" activation, (2) "Yellow Flashing Light" activation and (3) "Red Flashing Light" activation. In addition and in accordance with one or more embodiments, a "manual override" switch activation input signal can be included. In accordance with at least one embodiment, an additional input comprises input from a GPS device, such as GPS system 206.

Output signals from the interface module include an aural/visual alarm (i.e., A/VA) unit activation signal. The interface module can permit downloading of the stored contents of the recording module to an external IEEE 802.11. Standard WiFi device, such as is discussed herein. In one or more embodiments, software instructions, in the form of executable program code for computing system 201, can be downloaded from an external computer through a removable cable connected to the interface module.

An input, e.g., a digital signal from the GPS system 206, can be provided, which defines the speed of the PV. A signal such as that provided by GPS system 206 can provide a speed measurement with an accuracy of 1 mph and a latency of not more than 0.5 seconds, for example. A vehicle speed monitoring module can monitor the speed of the PV, e.g., by continuously comparing a speed input signal to a preset speed to determine if the speed is higher or lower than the preset speed. A logic signal can be continuously output by the vehicle speed monitor module to the logic module defining the outcome of the comparison. A hysteresis of approximately 1 MPH can be used in the comparison to prevent rapid toggling of the output. The accuracy of the comparison and recording can be +/−1.0 MPH over a range of 0 to 75 MPH with respect to the input signal.

In accordance with at least one disclosed embodiment, the GPS system 206 continuously stores a motion vector based on measured GPS velocity and direction. This vector can be extrapolated in the event that the satellite signals are interrupted due to obscuration or interference. The extrapolation continues until satellite signal re-acquisition occurs.

In accordance with at least one embodiment, the logic module is configured to accept PV signal input from the interface module as well as from the vehicle speed monitor to determine the state of a logic output signal. This logic output signal determines whether the an alarm unit of the warning system or a image capture unit (e.g., a camera) of the violation system are activated. FIG. 7 provides a table which illustrates examples of signals input to the PVSS and signals output by the PVSS, in response to input signals, in accordance with one or more embodiments of the present disclosure. The table provides an example of eight different PV scenarios, state of the input stimuli in each, and associated output generated in response.

Inputs can provide information such as whether a door of the PV is open or closed, the speed of the PV is above or below a threshold speed (which threshold speed is configurable), and whether certain lights on The PV (e.g., yellow, or amber, lights or red flashing lights) are on. The PVSS output can include signals to control aural/visual alarm ("A/VA") units of the warning system, and a control signal (a "motion activated camera," or MAC, signal) to control one or more cameras of the violation system so as to capture evidence of a violation, with or without annotation information.

For example and in a case that a PV is approaching, and is within 100 feet of a PV stop, input can be received by PVSS which indicates that the PV's yellow flashing lights are "on," the PV is traveling below the present speed, and the loading door is closed, the PVSS can generate a control signal to turn an aural/visual alarm unit "on," which results in an alert (e.g., aural alert, visual alert, or both) being produced by the PVSS' warning system, and one or more cameras of the violation system are made ready. When the PVSS receives input signals indicating that the PV is stopped for loading/unloading (i.e., the PVSS receives input indicating that the loading door is opened, the PV speed is below the threshold speed, the yellow lights are "off," and the red flashing lights are "on"), the PVSS deactivates the warning system, thereby causing any visual or aural warnings to be turned "off", and activates the violation system. If a vehicle violates the red flashing lights and fails to stop, for example, the violation system captures one or more images as evidence of the violation using the one or more cameras previously made ready.

After all of the passengers have been loaded/unloaded, the loading door is closed and the warning lights (e.g., the flashing yellow, or amber, lights) are turned "off." In response to input indicating that the loading door is closed and the warning lights are "off," the PVSS causes the warning system (e.g., visual or aural warnings) of the PVSS to be turned "on," such that a visual warning or an aural warning are turned "on." When the PV accelerates to a preset speed, the PVSS controls the warning system such that the visual or aural warnings are turned "off," and controls the violation system such that the external image data capture/recordation is stopped. In addition, when the PV stops at a traffic control point (stop sign or traffic light) the alarm remains "off" because the warning lights are not activated and the loading door remains closed. Also, when the PV stops at a railroad crossing the alarm unit remains "off" because even though the loading door is opened to listen for approaching trains, the PV warning lights are not activated.

When a "manual override" switch is used, the activation state of the warning system is changed. If the warning system is activated such that it is producing a warning and the manual override switch is depressed, output from the warning system stops (e.g., visual or aural warnings are stopped). Conversely, if the warning system is not activated, such that it is not generating a warning, depressing the manual override switch causes the warning system to be activated, such that a visual warning or aural warning is output by the warning system. In one or more embodiments, a manual override command can be active for a fixed period of time after an manual override switch is activated, and then the equipment state (e.g., the warning system state) reverts to a previous or default state.

Similarly and in accordance with one or more embodiments, a "manual override" can be performed on the violation system. If the violation system is in an inactive state, for example, a manual override can be used to activate the violation system to capture activity occurring in the vicinity of the PV. If the violation system is activated, a manual override can be used to deactivate the system, in a case that some mechanical or electrical component of the PV is being tested, for example. As discussed above, a manual override command can be active for a fixed period of time, after which the violation system reverts to a previous or default state.

The memory and recording module can record the PV input signals, the PV speed signal and the logic module output signals as well as any manual override activations. The memory module shall record the date, the time and the location data from the GPS system 206. In addition, the memory and recording module can record the BIT activation and the results of the BIT testing. The memory and recording module can record date/time indexed data for at least one day and retain the data for at least one year. In addition and in accordance with one or more embodiments, date/time of a recorded event can be extracted with a precision of one second with respect to the GPS system 206. The speed of the PV can be recorded by the memory module continuously with a precision of one MPH over a range of 0 to 75 MPH. The memory and recording module can provide the content of the memory for downloading to an external device through the interface module.

In accordance with at least one embodiment, the BIT module has two basic modes of operation: (1) provide feedback indicating the status of the PVSS, e.g., whether the PVSS is functioning properly at a given time, such as at the beginning of the day and (2) provide feedback as to the state of the PVSS throughout the day.

In accordance with at least one embodiment, the BIT module is used by the PV driver, who conducts a thorough inspection of the entire PV at the beginning of the day before the PV starts out on the assigned route. During this inspection, the driver initiates the BIT by activating the PV ignition switch. A yellow LED indicator on the Operator Interface panel shows that a BIT is in process. The driver is already required to activate the Warning Lights and the Loading Door during this inspection. These actions provide the stimuli to PVSS for the BIT to test the interface and logic circuits. A satisfactory result of the BIT is, for example, momentary activation of the warning, inside or violation systems. A sensor at each output unit (e.g., a visual warning unit which outputs a light strobe, an aural warning unit which outputs a warning sound) detects the presence of the desired sound and light strobe and terminates the BIT sequence.

The result of the BIT can be recorded by the memory and recording module. For example, successful completion causes the yellow BIT in process LED to extinguish and a green LED to be activated, and unsuccessful completion causes a red LED to be activated.

In one embodiment, the continuous BIT is implemented by circuitry monitoring the warning system's output units at each PV stop during the day. Failure to activate the warning system when it should have been or activation of the warning system when it should not have been can be detected by the BIT. A red failure LED, or other notification, can be activated as notification.

FIG. 8 provides an example of a violation system process flow in accordance with one or more embodiments of the present disclosure. While the process flow makes reference to a PV, it should be apparent that the process flow can apply to other types of PVs.

When the PV ignition is turned on, the violation system is automatically activated and functional to capture evidence of a violation occurring in the vicinity of the PV, at operation 800. A determination is made whether a set of lights (e.g., amber lights), are flashing (at operation 801). If so, the PV is considered to be in a loading zone (e.g., or is considered to be in a loading state), and at least one camera 204 of the violation system is activated (at operation 802). A determination is made (at operation 803) whether another set of lights, such as red loading lights, are turned on. If the red loading lights are determined to be on, images captured vicamera 204 (e.g., at least two successive images) is examined to determine (at operation 804) whether significant motion (e.g., motion that exceeds a predetermined threshold) is in the field of view. If so, processing continues (at operation 805) to annotate a set of frames with information about the violation (which annotating information can include information such as that described herein).

Once the imagery and annotation information are captured (at operation 805), processing continues (at operation 806) to determine whether the loading door is closed. If not, processing continues (at operation 804) to detect any motion. If it is determined (at operation 806) that the loading door is closed, processing continues (at operation 807) to determine whether the PV has reached a predetermined speed. If not, processing continues (at operation 804) to detect any motion violation.

If it is determined that the PV has reached a predetermined speed, processing continues (at operation 808) to deactivate image capture by the violation system and its camera(s) 204. Processing continues at operation 801 to watch for a change in condition, e.g., activation of the flashing ambers.

If it is determined that the flashing ambers are not turned on (at operation 801), processing continues at operation 810 to determine whether to transfer data from the PVSS (e.g., to external storage provided by a server). If not, processing continues at operation 810 to check for the amber flashing lights. If data is to be transferred, processing continues at operation 811 to determine whether a network (e.g., a Wi-Fi network) connection is detected. If a network is detected, a handshaking processing process is undertaken between the PVSS and the network, at operation 812, and data is transferred to external storage, at operation 813. When a determination is made, at operation 814, that the data transfer is complete, processing continues at operation 801 to detect the activation of the amber flashing lights. If the violation system is unable to detect the WiFi network or to establish a connection via the WiFi network (at operations 811 and 812), processing continues (at operation 801) to monitor signals received from the PV's components (e.g., PV's light systems, including the PV's amber lights).

FIG. 9 provides an example of a warning system process flow in accordance with one or more embodiments of the present disclosure. While the process flow makes reference to a school PV, it should be apparent that the process flow can apply to other types of PV's.

When the PV ignition is turned, the warning system is automatically activated (at operation 901) and functional to generate alarms to warn individuals/passengers. The warning system is activated with the alarm output turned off, and alarms can be generated based on determinations made by the warning system whether the PV is in a loading zone (e.g., or is considered to be in a loading state). A determination is made (at operation 902) whether alarm output is turned off. If so, a determination is made (at operation 903) whether the PV is in motion. If the PV is in motion, processing continues (at operation 904) to determine whether a first set of lights (e.g., amber lights) are on. If a determination is made that the lights are on, processing continues (at operation 905) to determine whether the PV has slowed down to a predetermined speed. When a determination is made that the PV has slowed down to the predetermined speed and a loading door is determined to be open (at operation 904), the warning system (e.g., the visual subsystem or the aural subsystem) is activated (at operation 907).

The determinations made (at operations 903 to 906) result in the warning system's alarms being turned on in a case that the PV is in motion traveling at less than a threshold speed, its amber lights are on, and its loading doors are closed. The warning system turns the alarm(s) off in a case that the loading doors are determined to be open, the PV is determined to be stopped, or the amber lights are determined to be off. Once the alarm output is turned on (at operation 907), processing continues (at operation 902) to determine whether any of the mentioned conditions exist. Thus, once it is determined (at operation 902) that the alarm output is on, processing continues (at operation 908) to deter mine whether the loading door(s) is open. If so, processing continues (at operation 910) to turn the alarm output off. If it is determined (at operation 908) that the loading doors are closed, processing continues (at operation 909) to determine whether the PV has reached the threshold, or target, speed. If it is determined (at operation 909) that the PV has not reached the threshold, or target, speed, processing continues (at operation 907) to ensure that the alarm output is turned on. When the PV accelerates to the threshold, or target, speed, the warning system turns the alarm output off (at operation 910).

FIG. 10 provides an example of an inside, or intra-vehicle, system process flow in accordance with one or more embodiments of the present disclosure. While the process flow makes reference to a school PV, it should be apparent that the process flow can apply to other types of PVs.

When the PV ignition is turned, the intra-vehicle system is automatically activated (at operation 1000) and functional to record activity inside the PV. Processing (at operation 1001) determines whether at least one camera 204 positioned inside the PV is turned on. If so, processing continues (at operation 1002) to determine whether the recorder 202 is on. If so, processing continues (at operation 1003) to determine whether a data transfer connection exists between the PVSS and the depot server. If so, processing continues (at operations 1004 and 1005) to perform handshaking techniques and to transfer the images, as well as any annotating information, to the depot server. If the intra-vehicle system is unable to detect the WiFi network or to establish a connection with the depot server via the WiFi network, processing continues (at operations 1001 and 1002) to monitor the status of camera(s) 204 and recorder 202 (at operations 1001 abd 1002). When it is determined (at operation 1006) that data transfer is complete, processing can continue (at operations 1001 and 1002) to monitor the status of camera(s) 204 and recorder 202, and (at operations 1003 to 1005) to transfer images etc., such as those captured by the intra-vehicle system since the last data transfer.

The PVSS is likely to encounter environmental conditions, such as temperature, altitude, vibratory, shock, rain, humidity, etc. The following provide examples of environment criteria which can be used in selecting components of a PVSS, in accordance with one or more embodiments of the present disclosure. Components mounted within an environmentally controlled portion of the PV can be selected so as to perform over an ambient temperature range of 0 degrees(F.) to +100 degrees (F.) without external forced air cooling. In addition and in accordance with at least one embodiment, components can survive storage for 12 hours at an ambient temperature between −40 degrees (F.) to +150 degrees (F.). Externally-mounted components can be selected to perform over an ambient temperature range of −40 degrees (F.) to +150 degrees (F.). One example of an operational altitude range for a component is −300 ft mean sea level (MSL) to 10000 Ft. MSL.

Components which are hard mounted can be selected so as to perform even in a case of being subjected to +/−2 g vibratory acceleration over a frequency range of 2 Hz to 100 Hz, or after being subjected to a 5 g shock for 11 milliseconds. Selected externally-mounted components can withstand a rain rate of 2 inches/hour, however, the performance of an externally mounted camera units may be effected by the rain rate. Components can perform under conditions of 100% humidity with condensation. In addition, camera units may use heaters to prevent condensation on the optical apertures. In accordance with at least one embodiment, it is contemplated that a PVSS can perform under any reasonable combination of specified environmental conditions, and at least in accordance with the conditions noted herein.

In accordance with one or more embodiments, the revenue generated from fines imposed for traffic violations (e.g., criminal or civil traffic violation) identified using one or more aspects of a PVSS can be used to fund installation (and retrofit) of a PVSS in an existing PV. In addition, the revenue can be used configure a new PV with a PVSS. The revenue can be used to upgrade, or replace, an existing PVSS. The revenue can also be used to train passengers, or possible passengers, how the PVSS or a subsystem (e.g., violation, warning, or intra-vehicle subsystems) work. In a case of the warning system, training can include information as to the meaning of the aural or visual alerts. Training can also include public service advertisements concerning the danger or legal consequences associated with stop arm, or other traffic, violations that can occur in the vicinity of a PV. In accordance with one or more embodiments, a violator pays a fine to a governmental entity in connection with a traffic violating. The governmental entity can use the revenue collected from fines received from violators to fund one or more contracts with at least entity, e.g., a vendor, to install a PVSS in each of a number of PVs. The revenue collected from the traffic violations can be shared between the governmental entity and at least one PVSS vendor. In addition, it should be apparent that the governmental entity need not be the owner of the PVs into which the PVSS is being installed. For example, another entity (e.g., a school district) can own the PVs into which a PVSS is installed under a contractual arrangement between a governmental entity (e.g., a city) and a PVSS vendor/supplier.

In addition, it is contemplated that certain criteria can be used to determine whether to install a PVSS. For example and with reference to a school PV, initially, only the PVs assigned to routes of high incidence of stop arm violations are equipped with a PVSS. To illustrate and assuming that a PV fleet has a total of up to 170 PVs, 7 PVs may, at least initially, be equipped, for a PV fleet of 171 to 300 PVs 20 PVs may be equipped, and fleets having between 301 and 450 PVs may have 40 PVs equipped, at least initially, with a PVSS.

Assuming that, on the average, there may be 9 stop arm violations per PV route per day on the high violation incidence routes, there can be 20 photographic frames collected for each violation. In accordance with one or more embodiments of the present disclosure, a photographic frame can contain 3.1 mega pixels, for example. An industry standard data compression can be used to reduce storage space needed. Assume that PV fleets of less than 300 PVs will use one parking area and PV fleets greater than 300 PVs will have two or more parking areas. It can assume that a maximum latency of 8 hours can be permitted; from the time that a PV returns to the storage yard until the time that a completed citation with supporting photo's attached is transmitted to law enforcement. Once the information about a violation is transmitted to law enforcement, an analyst can spend a period of time, e.g., 5 minutes, to retrieve, select, analyze, enhance, archive the information, and to generate a citation for a given violation. Although likely dictated by local law or regulation, a citation and supporting photo's might be archived for one year and all data collected that does not result in a citation might be archived for at least 30 days.

FIG. 11 provides an example of a stop arm violation data flow and data retention in accordance with one or more embodiments of the present disclosure. In the example, a school PV is shown as the PV. It should be apparent that other types of vehicles can substituted in place of a school PV.

Data from PV 1102 is transferred from storage on the PV to data server 1104, e.g., a PV depot data server. Data includes evidence of a traffic violation, such as a stop arm violation, which can include as images of the violation as well as annotation information, as described herein. The data is transmitted from data server 1104 to data center server 1106. Data can be transferred via a wired, wireless or hybrid (e.g., a network comprising both wired and wireless components) network. The data can be transmitted in an encrypted form in order to maintain a chain of custody.

The data can reside in server 1106 for access by a work-station terminal, such as work-station 1108. Work-station 1108 operator reviews the image data and annotation data, such as information shown in FIG. 4, for example.

The operator examines the information corresponding to an "incident" to determine whether the incident amounts to a violation at decision block 1110. If the incident is determined to not be a traffic violation, the data is stored in data server 1106 for a first period of time, e.g., ninety (90) days. If the operator determines that the incident amounts to a traffic violation, the package is forwarded (e.g., via regular mail or other non-electronic delivery, or transmitted electronically) to law enforcement 1112 (e.g., police department or district attorney's office) for evaluation or approval (e.g., determination whether there is enough evidence to prove the violation occurred). If the package/evidence is approved, a court data is scheduled at 1114. The evidence is retained by data server 106 for a second period of time, e.g., one year. A summons, or other notification of the violation and scheduled court date is served on the accused violator, at 1116. The accused then appears in court at 1118 on the scheduled date.

The above example makes reference to a criminal traffic violation. However, it should be apparent that embodiments of the invention can be used in a case of a civil traffic violation. For example and in a case that the package/evidence is approved at 1114, a traffic ticket can be mailed to a violator, and the violator then has an opportunity to respond, e.g., guilty or not guilty plea and in a case of a guilty plea, payment of the appropriate traffic fine).

While the apparatus and method have been described in terms of what are presently considered to be the best mode, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A system comprising:

a violation system carried by a passenger vehicle and configured to record information associated with a traffic violation committed by a driver of another vehicle that occurs in a vicinity of the passenger vehicle;

an intra-vehicle system carried by the passenger vehicle and configured to monitor human behavior, at least a portion of the behavior occurring inside the passenger vehicle;

a warning system configured to provide at least one warning to a person in a vicinity of the passenger vehicle, the warning comprising at least one of a visual warning and an aural warning; and a controller configured to receive an input and to control one or more of the violation, intra-vehicle and warning systems in response to the received input.

2. The system according to claim 1, wherein the associated information comprises one or more images of the other vehicle.

3. The system according to claim 2, wherein the associated information comprises one or more images of driver of the other vehicle.

4. The system according to claim 3, wherein the first input comprises information indicating that the passenger vehicle is in a loading state and the other vehicle is passing in the vicinity of the passenger vehicle.

5. The system of claim 3 wherein the associated information further comprises an image of a license plate of the other vehicle.

6. The system according to claim 1, wherein the controller controls the violation system in response to a first input identifying a traffic violation, the violation system being controlled to capture evidence comprising at least one image of the violation.

7. The system according to claim 1, wherein, in response to an input that the passenger vehicle is in, or about to enter, a loading state and that a speed of the passenger vehicle is at or below a threshold speed, the controller is configured to activate the warning system.

8. The system according to claim 1, wherein, in response to an input that the passenger vehicle is in operation, the controller is configured to activate the intra-vehicle system.

9. The system according to claim 1, further comprising:

a storage unit;

a global positioning system (GPS) unit;

a timer;

a security module configured to encrypt data stored in the storage unit;

a plurality of cameras;

a monitor displaying images captured by one or more of the plurality of cameras; and a network interface.

10. The system of claim 9, wherein the network interface interfaces to a wired network, a wireless network, or a combination of wired and wireless networks.

11. The system of claim 10, wherein the network interface is used to transmit data stored in the storage unit to a server connected via the network interface.

12. The system of claim 11, wherein the network interface transmits data via a wireless network comprising multiple channels and multiple antennae so as to provide overlapping coverage in an area, the network interface selecting a channel and antenna combination that provides a signal quality capable of transmitting the data.

13. The system of claim 12, wherein the network interface determines a signal quality to determine the channel and antenna combination.

14. The system of claim 13, wherein the network interface selects a different channel and antenna combination if a determined signal quality of a previously selected channel and antenna combination drops below a predetermined threshold.

15. The system of claim 11, wherein the network interface is configured to transmit some or all of the data in an encrypted form.

16. The system of claim 9, wherein the information associated with a traffic violation includes at least one of: location information supplied by the GPS unit, date information, and time information.

17. The system of claim 16 wherein the information comprises when and where the violation occurred.

18. The system of claim 9, wherein the GPS unit is configured to generate position and velocity data corresponding to the passenger vehicle.

19. The system of claim 18, wherein the GPS unit is configured to determine whether a plurality of satellite signals have a sufficient signal strength, generate position and velocity data from the plurality of satellite signals in a case that there is sufficient signal strength or generate an estimated position and velocity information from previously-generated position and velocity data in a case that there is insufficient signal strength.

20. The system of claim 1, further comprising a motion detection unit coupled to the violation system, the motion detection unit detecting motion in the vicinity of the passenger vehicle.

21. The system of claim 20 wherein the motion detection system notifies the violation system of the motion such that the violation system records information associated with a traffic violation that occurs in a vicinity of the passenger vehicle in response to the notification.

22. The system of claim 1 wherein the passenger vehicle is a school bus.

23. The system of claim 22 wherein the traffic violation comprises illegally passing the school bus.

24. A system comprising:

processing unit;

an alarm unit controlled by the processing unit to generate an output to alert persons on or in a vicinity of a passenger vehicle;

a first set of one or more image capturing devices controlled by the processing unit to record evidence of a traffic violation committed by a driver of another vehicle occurring in a vicinity of the passenger vehicle;

a second set of one or more image capturing devices controlled by the processing unit to monitor activity within the passenger vehicle, wherein the processing unit is configured to receive input signals and to generate one or more control signals to control the alarm unit and the image capturing devices.

25. The system of claim 24 wherein the passenger vehicle is a school bus.

26. The system of claim 25 wherein the traffic violation comprises illegally passing the school bus.

27. The system of claim 24 further including at least one device for recording audio within the passenger vehicle.

28. A system comprising:

a first set of one or more cameras, each of the cameras in the first camera set positioned on an external surface of a passenger vehicle, the first set of cameras configured to record images of a traffic violation by a driver of another vehicle occurring in a vicinity of the passenger vehicle;

a global positioning system (GPS), the GPS configured to output at least velocity information;

a timer configured to output information including a traffic violation time;

a warning system configured to generate one or more alerts for persons in a vicinity of the passenger vehicle, said one or more alerts warning of a potentially dangerous condition;

an intra-vehicle monitoring system consisting of a second set of one or more cameras mounted within the passenger vehicles and at least two cameras mounted outside the passenger vehicle at a location where passengers board or exit the passenger vehicle;

a digital video recorder (DVR) device, the DVR storing at least one or more visual images captured by the second set of cameras;

a memory storing information corresponding to a traffic violation; and a network interface, the network interface configured to transmit data to a server.

29. The system of claim 28 wherein the passenger vehicle is a school bus.

30. The system of claim 29 wherein the traffic violation comprises illegally passing the school bus.

31. A method comprising:

using a passenger vehicle safety system installed in a passenger vehicle, the passenger vehicle safety system capturing one or more images and corresponding information associated with a traffic violation by another vehicle occurring in a vicinity of the passenger vehicle;

collecting a fine from a violator using the one or more images and corresponding information; and using at least a portion of the collected fine to install a passenger vehicle safety system in another passenger vehicle.

32. The method of claim 31, further comprising:

using at least a portion of the collected fine to present educate the public as to safe practices in or near a passenger vehicle.

33. The method of claim 31, wherein the traffic violation comprises a criminal traffic violation.

34. The method of claim 31, wherein the traffic violation comprise a civil traffic violation.

35. The system of claim 31 wherein at least a portion of the fine is further used to maintain the installed passenger vehicle safety system.

36. A method comprising:

receiving, by a server computer from a passenger vehicle safety computing system, encrypted information comprising one or more digital images and associated information corresponding to a traffic incident occurring, in a vicinity of a passenger vehicle;

accessing a decrypted copy of the received data to determine whether the traffic incident involved a traffic violation;

in a case that the traffic incident is determined to involve a traffic violation, performing the following:

using information identified from the one or more digital images and associated information to retrieve information corresponding to an individual involved in the traffic incident from a database;

generating a violation notification; and transmitting the violation notification to the individual.

37. A method of claim 36, wherein the traffic violation is a criminal traffic violation and the violation notification comprises criminal traffic violation notification.

38. A method of claim 37, wherein the criminal traffic violation notification comprises a summons.

39. A method of claim 36, wherein the traffic violation is a civil traffic violation, and the violation notification comprises a civil traffic violation notification.

40. A method of claim 39, wherein the civil traffic violation notification comprises a ticket.

* * * * *